(12) United States Patent
Moser

(10) Patent No.: US 9,525,765 B2
(45) Date of Patent: Dec. 20, 2016

(54) ERGONOMIC ANECHOIC ANTI-NOISE CANCELING CHAMBER FOR USE WITH A COMMUNICATION DEVICE AND RELATED METHODS

(71) Applicant: Quiet, Inc., La Jolla, CA (US)

(72) Inventor: Scott A. Moser, La Jolla, CA (US)

(*) Notice: Subject to any disclaimer, the term of this patent is extended or adjusted under 35 U.S.C. 154(b) by 0 days.

(21) Appl. No.: 14/979,265

(22) Filed: Dec. 22, 2015

(65) Prior Publication Data

US 2016/0134734 A1     May 12, 2016

Related U.S. Application Data

(63) Continuation-in-part of application No. 14/943,856, filed on Nov. 17, 2015, and a continuation-in-part of application No. 14/740,129, filed on Jun. 15, 2015, now Pat. No. 9,253,299, and a continuation-in-part of application No. 14/577,839, filed on Dec. 19, 2014,
(Continued)

(51) Int. Cl.
| | |
|---|---|
| H04M 1/00 | (2006.01) |
| H04M 1/03 | (2006.01) |
| H04R 1/10 | (2006.01) |
| H04R 1/08 | (2006.01) |
| H04M 1/19 | (2006.01) |
| H04R 1/22 | (2006.01) |
| H04R 1/34 | (2006.01) |
| G10K 11/178 | (2006.01) |
| H04M 1/05 | (2006.01) |

(Continued)

(52) U.S. Cl.
CPC .......... *H04M 1/035* (2013.01); *G10K 11/1782* (2013.01); *H04M 1/19* (2013.01); *H04R 1/083* (2013.01); *H04R 1/10* (2013.01); *H04R 1/225* (2013.01); *H04R 1/342* (2013.01); *G10K 11/16* (2013.01); *G10K 2210/108* (2013.01); *H04M 1/05* (2013.01); *H04M 1/17* (2013.01); *H04R 2201/107* (2013.01); *H04R 2499/11* (2013.01)

(58) Field of Classification Search
CPC ........................... H04M 1/05; H04R 2201/107
See application file for complete search history.

(56) References Cited

U.S. PATENT DOCUMENTS

| 1,800,234 A | 4/1931 | Tuttle |
|---|---|---|
| 2,160,229 A | 5/1939 | Rupert |
| (Continued) | | |

FOREIGN PATENT DOCUMENTS

| CN | 2262732 Y | 9/1997 |
|---|---|---|
| CN | 1949363 A | 4/2007 |
| (Continued) | | |

*Primary Examiner* — Simon King
(74) *Attorney, Agent, or Firm* — Buche & Associates, P.C.; John K. Buche; Bryce A. Johnson

(57) ABSTRACT

Disclosed, in general, are devices that provide a substantially active noise canceling area over a sound source by causing disruptive interference to all frequency fields of speech sounds from the sound source. In some embodiments, active noise control or active noise cancellation means ("ANC means") are provided to the device. Said means include one or more active noise canceling speakers for the addition of sound specifically designed to cancel noise from the speech sound source without interfering with the sound source going to the microphone, so the listener can clearly hear what the user is saying.

10 Claims, 33 Drawing Sheets

Related U.S. Application Data said application No. 14/740,129 is a continuation-in-part of application No. 14/577,839, filed on Dec. 19, 2014, which is a continuation-in-part of application No. 14/280,523, filed on May 16, 2014, now Pat. No. 8,948,411, said application No. 14/943,856 is a continuation-in-part of application No. 14/577,839, filed on Dec. 19, 2014.

(60) Provisional application No. 61/949,239, filed on Mar. 7, 2014, provisional application No. 61/949,234, filed on Mar. 6, 2014, provisional application No. 61/941,306, filed on Feb. 18, 2014.

(51) Int. Cl.
*G10K 11/16* (2006.01)
*H04M 1/17* (2006.01)

(56) References Cited

U.S. PATENT DOCUMENTS

| | | | |
|---|---|---|---|
| 2,479,806 A | 8/1949 | Berkley | |
| 2,625,615 A | 1/1952 | Webb | |
| 2,657,609 A | 11/1953 | Strobach | |
| 3,796,842 A | 3/1974 | Guille | |
| 4,396,089 A | 8/1983 | Scully | |
| 4,792,013 A | 12/1988 | Boynton | |
| 4,890,688 A | 1/1990 | Baker | |
| 4,932,495 A | 6/1990 | Chapman | |
| 4,998,959 A | 3/1991 | Purdie | |
| 5,319,355 A * | 6/1994 | Russek | A61B 5/0002 128/202.22 |
| 5,608,808 A * | 3/1997 | da Silva | G02C 11/10 351/123 |
| 5,778,062 A | 7/1998 | Vanmoor | |
| 6,320,959 B1 | 11/2001 | Crouch et al. | |
| 6,373,942 B1 * | 4/2002 | Braund | H04M 1/05 379/430 |
| 6,401,860 B1 | 6/2002 | Ellington et al. | |
| 6,510,311 B1 | 1/2003 | Stitt | |
| 7,197,140 B2 | 3/2007 | Asaro | |
| 7,515,708 B1 | 4/2009 | Dotty, III et al. | |
| 7,532,719 B2 | 5/2009 | Snodgrass | |
| 7,564,968 B2 | 7/2009 | Ayers et al. | |
| 7,783,034 B2 | 8/2010 | Manne | |
| 8,243,944 B2 | 8/2012 | Almagro | |
| 8,532,987 B2 | 9/2013 | Holzrichter | |
| 2002/0077838 A1 | 6/2002 | Dutta | |
| 2004/0161104 A1 * | 8/2004 | DeMichele | H04R 1/12 379/451 |
| 2007/0036149 A1 * | 2/2007 | Snedecor | H04M 1/19 370/352 |
| 2007/0127659 A1 * | 6/2007 | McClory | H04M 1/19 379/161 |
| 2009/0060169 A1 * | 3/2009 | Manne | H04M 1/05 379/430 |
| 2010/0250231 A1 * | 9/2010 | Almagro | G06F 17/289 704/2 |
| 2011/0136535 A1 | 6/2011 | DiPasquale et al. | |
| 2012/0029912 A1 * | 2/2012 | Almagro | G10K 11/1782 704/226 |
| 2012/0095768 A1 | 4/2012 | McClung et al. | |
| 2013/0276615 A1 | 10/2013 | Antaki | |
| 2014/0306585 A1 * | 10/2014 | Hu | B29C 43/02 312/223.1 |

FOREIGN PATENT DOCUMENTS

| | | |
|---|---|---|
| DE | 19722045 | 7/1998 |
| EP | 0637188 A1 | 2/1995 |
| EP | 0831453 A3 | 3/1997 |
| EP | 2674048 | 12/2013 |
| WO | WO9914733 | 3/1999 |
| WO | PCT/US14/73080 | 4/2015 |

* cited by examiner

ERGONOMIC ANECHOIC ANTI-NOISE CANCELING CHAMBER FOR USE WITH A COMMUNICATION DEVICE AND RELATED METHODS

CROSS-REFERENCE TO RELATED APPLICATIONS

This application is a continuation-in-part of U.S. Ser. No. 14/943,856 (filed Nov. 17, 2015) and U.S. Ser. No. 14/740,129 (filed Jun. 15, 2015), which are continuation-in parts of U.S. Ser. No. 14/577,839 (filed Dec. 19, 2014), which is a continuation-in-part to U.S. patent application Ser. No. 14/280,523 entitled "Ergonomic tubular anechoic chambers for use with a communication device and related methods" filed on May 16, 2014. Both referenced U.S. Ser. No. 14/577,839 and U.S. Ser. No. 14/280,523 applications also claim the benefit and priority of U.S. Prov. Pat. App. Ser. No. 61/949,239 (filed Mar. 7, 2014) entitled "Accessory having an anechoic chamber for isolating noise of a wind instrument." Said referenced applications further claim the benefit and priority of U.S. Pat. App. Ser. No. 61/949,234 (filed Mar. 6, 2014) entitled "Tubular Anechoic Chamber for Use With a Communication Device." Said patent applications are hereby incorporated by reference in their entirety as if fully set forth herein.

STATEMENT REGARDING FEDERALLY SPONSORED RESEARCH OR DEVELOPMENT

Not applicable.

BACKGROUND OF THE INVENTION

Field of Invention

The subject matter of this written description is in the field of devices for canceling, containing, absorbing and/or directing noise from a sound source while deflecting, absorbing and reflecting ambient noise. The subject matter of this disclosure is also in the field of systems and methods for maintaining privacy or avoiding public disruption during use of a communication device such as a telephone, mobile phone, two-way radio, and the like. Finally, this invention relates to an accessory for canceling, isolating, directing, containing, and/or absorbing of musical noise (e.g., sounds produced by singing or by musical instrument) and more particularly, to sound accessories configured to removably attach to the mouth or bell portion of a wind instrument for reducing noise expelled therefrom, for example, during a practice session.

Background of the Invention

Mobile and fixed line communication devices ("communication devices"), such as cellular phones, two-way radios, or home phones, have become ubiquitous. In fact, some reports show telephone use by eighty seven percent of the global population. The commonality of these devices has resulted in their public use within the local vicinity of others. Conventional communication devices are not always suitable for public use. First, use of a conventional communication device in public often requires the user to expose the private details of a communication to others within the local vicinity. Even when a user retreats to a secluded location, the communications are subject to eavesdropping (e.g., by parabolic microphone, binoculars for lip reading, laser sound pick-up devices, and other distance eavesdropping devices). Subjecting the details of a secret or private communication to others is particularly concerning when such details involve matters of national security (e.g., details concerning FBI, CIA, diplomats, fire station, police, or military matters). Second, ambient noises in public areas can frequently disrupt a communication. For instance, ambient noise can frequently make it difficult for the user of the communication device to receive clear communications on the communication devices or to speak understandable commands to a device's computer assistant employing voice recognizing software (e.g., SIRI® as utilized by the iPhone®). Thus, a need exists for apparatus and related methods for maintaining the privacy and clarity of communications over communication devices while avoiding the disturbance of others in the vicinity.

In view of the foregoing, many have proposed apparatus for enhancing privacy and clarity of communication devices while avoiding the disturbance of others nearby. These proposed apparatus involve covering the mouth or ear with a communication device so that a chamber is created over the mouth or ear in an attempt to confine the communicative sounds while blocking ambient noise. For instance, U.S. Pat. No. 7,564,968, US. Pub. App. No. 2011/0136535, U.S. Pat. No. 7,197,140, U.S. Pat. No. 8,778,062, and U.S. Pat. No. 7,515,708 disclose apparatus that are positioned over or in front of a mouth. Although capable of limited muffling of communicative sounds produced by the user of a communication device, these devices are not capable of capturing all of the communicative sounds of a device user that would otherwise be intelligible to those in the nearby vicinity. While some of these devices are capable of blocking small amounts of the direct field of communicative sounds, they are frequently inadequate for containing the more intense reverberant fields of the human speech sounds, for example, the reverberant fields of a male voice can be as low as eighty Megahertz (MHz). This functional inadequacy is the result of two factors. First, the materials (or lack thereof) employed are not capable of absorbing enough of the communicative sound to render the communication unintelligible to eavesdroppers. Second, the chambers are not air-tight (particularly at any interface between the apparatus and the user's face (specifically, the ear and mouth)). When a chamber and related parts of the device are not air-tight, the direct or reverberant fields of the near-field (sounds in close proximity to the sound source) communicative sound (which is an acoustic sound wave through air) can leak out from the chamber before being totally absorbed by the chamber walls. Even when such apparatus initially form a seal around the mouth of a user, these seals can be upset by either (1) the sound air pressure or acoustic particle velocity of the communicative sound's near field sound energy (which are much more extreme than direct or reverberant fields) or (2) misalignment of the mouth and chamber near the upper and lower lips (i.e., the menton-subnasale length, bitragoin-subnasale arc area, and bitragoin-menton arc area) during movements of a user's face during normal speech. Misalignment along the menton-subnasale length, bitragoin-subnasale arc area, and bitragoin-menton arc area is particularly problematic when an apparatus must simultaneously provide mouth and ear coverings during use because these devices allow the ear coverings to operate despite misalignment along the menton-subnasale length area, bitragoin-subnasale arc area, or bitragoin-menton arc during movements of a user's face whereby a user may not even realize that sound from a private communication is being released. Even the slightest release of sound can be concerning during extremely sensitive communications over a communication device, for instance, during doctor-patient communications, lawyer-client communications, stockbroker-investor communications, interfamily communications, or communications involving national security. Furthermore, these devices are not substantially available for blocking ambient noise and thus clarity of communication using these devices can be compromised.

Other apparatus for enhancing privacy or clarity of communication involve a user facemask for creating a chamber over the mouth of a user. See, e.g., US Pub. Pat. No. 2007/0127659, U.S. Pat. No. 8,234,944, U.S. Pat. No. 7,783,034, and CN Pat. No. 2262732. However, these types of apparatus suffer from the drawbacks mentioned above, with the additional problem of being attention calling. Frequently, participants of a private communication, like national security agency members, do not want additional attention drawn to them by their communication device during sensitive telephone communications. Additionally: none of these facemask apparatus allow the user to breath freely while being used without taking the device away from their face; none of the prior art have a controlled direction of airflow with sound energy to exit out the device in a controlled manner, with the users air from speech passing across a microphone without the intake air passing by the microphone so no acoustic interference will occur with the microphone; and none of the prior art use materials that are technically able to absorb the low base frequencies i.e. modelling clay that does not dry out and remains malleable.

Musicians, like communication device users, are frequently desirous of privately or discretely producing sounds in public areas. For instance, opera singers or woodwind instrument players may desire to practice their craft in a public park without disturbing the splendor of the general public. Like users of communication devices, a musician cannot always retreat to a secluded location or even their homes because, for example, within many neighborhoods (especially modern apartments, condominium and townhomes) people are increasingly living in closer proximity to one another. Thus a need exists for apparatus and related methods for maintaining the privacy of musical sounds.

For singers, apparatus exist that are similar to those described above in connection with communication devices. See, e.g., U.S. Pat. No. 2,625,615, U.S. Pat. No. 4,396,089, and U.S. Pat. No. 4,932,495. These devices are essentially facemasks that cover the mouth of the singer in an attempt to create a sound muffling chamber over the mouth. These apparatus are particularly susceptible to leaked sounds. As discussed above in connection with apparatus for communication privacy apparatus, such chambers either are either (a) not capable of absorbing the near, direct, and reverberant fields of a singer's voice or (b) allow sounds to leak via misalignment of the mouth and chamber along the mentocervical angle length, menton-subnasale length, bitragoin-subnasale arc, or bitragoin-menton arc during movements of a user's face. Misalignment of the face contours and mask are particularly problematic during singing since the users facial movements are exaggerated when compared to a person that is talking, particularly along the menton-subnasale length. Other problems arise in that the apparatus distort the sounds made by the user so that a user cannot totally tell if the sounds produced are correct. Therefore, a need exists for apparatus and related methods for maintaining the privacy of musical sounds of singers.

For woodwind instrument players, apparatus also exists for dampening the sound of the instrument. However, these apparatus typically involve either placing a covering around the whole instrument, or muffling the sound. These types of apparatus do not adequately address the need for apparatus that maintain the privacy of musical sounds. One reason these are inadequate is that many woodwind instruments require a user's hands to move over and about the instrument. Encasing the instrument is problematic because the encasing apparatus must feature holes that leak sound while providing hand-access or else restrict access to the instrument. Muting the instrument is problematic because the musician must hear the noises to determine whether the instrument is being played correctly. As a result, a need still exists for apparatus and related methods for maintaining the privacy of musical sounds of singers.

SUMMARY OF THE INVENTION

In view of the foregoing, it is an object of this disclosure to describe an apparatus for maintaining the privacy and clarity of communications over devices and sounds of musical instruments or voices. It is another objective to disclose such apparatus without the drawbacks identified above. Disclosed, in general, are devices that provide a substantially active noise canceling area over a sound source by causing disruptive interference to all frequency fields of speech sounds from the sound source. In some embodiments, active noise control or active noise cancellation means ("ANC means") are provided to the device. Said means include one or more active noise canceling speakers for the addition of sound specifically designed to cancel noise from the speech sound source. In general, the devices feature: ANC means that are configured to destructively interfere with a sound source by the addition of an antiphase sound in an area around the sound source; a support arm for supporting the ANC means proximate to the sound source. Suitably, the ANC means are adapted to destructively interfere with sound energy generated by the sound source (e.g., human voice), and substantially cancel the sound energy. In one configuration, the apparatus features an ear sealed chamber coupled to the support arm and positioned over a user's ear to keep ambient sounds out of a user's ear.

The amount of sound energy can be reduced via the presence of an ANC means (like an antiphase/anti-noise speaker) for reducing the sound energy. Suitably, the antiphase sound waves may operate as a soundwave "wall" in the area around the mouth and in a matching volume level to cancel sound energy from the sound source (i.e., the human voice). Suitably, once the anti-noise/anti-phase speaker sound waves hit the user's face, the residual sound, not noise canceled, becomes absorbed by the user's face with the reverberant energy reflecting off at a highly diminished decibel level.

It is yet a further objective to disclose devices that provide a substantially active noise canceling area over a sound source by causing disruptive interference to all megahertz frequency fields of communicative sounds by male and female speakers. In one embodiment, the device is defined by: a plurality of ANC means antiphase/anti-noise speakers disposed about a receiver portion of a communication device; a support arm for the ANC means and receiver portion; and an ear chamber with an ear opening dampening acoustics about a microphone of a communication device. In a preferred embodiment, the device features electronics software on a printed circuit board (PCB), which measures the sound of a user's voice via a microphone and creates an antiphase noise to cancel the sound of the user's voice in substantially real-time (the best as the software can interpret the speech sounds and create antiphase sound waves). In a preferred embodiment, the ear and ANC means are configured for placement so that the device lies along the mentocervical angle, mentocervical angle length, menton-subnasale length, bitragoin-subnasale arc, or bitragoin-menton arc of a user at a range of nineteen to twenty three degrees. Other embodiments may not incorporate these angles. In use, a mouth may be placed adjacent to the ANC means and receiver portion to position the mouth so that the acoustics of a communicative sound from the mouth are directed toward the receiver portion of the communication device. In a preferred embodiment, air from the user's breath during speech is directed through anti-phase noise created by the ANC means after interaction with the receiver portion of the device for improved acoustic absorption and microphone sound pick-up. The result is voice communication being noise canceled after pickup by the receiver for maintaining privacy of the phone conversation.

Preferably, the apparatus is configured to fit securely in front of the mouth and over the ear a user, without breaking the seal between the ear opening and the ear of a user. Suitably, this is accomplished via positioning the apparatus at a metocervical angle in a range of fifteen and twenty five degrees relative to the face of a user. Other embodiments need not incorporate these angles. A preferable metocervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc anthropometric measurements. This insures the provision of an anti-noise coverage area around the entire menton subnasale area (i.e., direct contact area of the entire perimeter of the product's face sound seal) and the center of the ear.

It is yet a further objective of the invention to disclose a device that works in conjunction with a phone and provides or otherwise broadcasts an anti-noise area over a sound source to destructively interfere with relatively all frequency fields of speech from the sound source.

Finally it is an object of the disclosure to describe a telephone handset that features an antiphase/anti-noise speaker proximate to a receiver so that noises provided thereto the receiver can be combated with antiphase noises.

Other objectives and desires may become apparent to one of skill in the art after reading the below disclosure and viewing the associated figures. Also, these and other embodiments will become apparent from the drawings.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

Disclosed, in general, are devices that provide an air-tight chamber over a sound source while trapping, containing, absorbing, directing and deflecting all fields of sounds from the sound source (e.g., the mouth of a human or a woodwind instrument). In general, the devices feature: a specialized anechoic chamber that is configured to receive a sound source in an air-tight manner; and a specialized anechoic channel that is in fluid communication with the ambient atmosphere. Suitably, the anechoic chamber is adapted to capture air containing sound energy generated by the sound source, and distribute the air about an internal surface area on the inside of the chamber, wherein the internal surface area is sufficiently large to dampen or otherwise absorb the sounds energy. Preferably, the air is directed from the anechoic chamber through an anechoic tubular channel extending therefrom to the ambient to further dampen or absorb the sound energy. In one configuration, the outer wall of the apparatus is configured to reflect ambient sounds. The more specific details of the preferred embodiment are disclosed in connection with the figures.

By allowing the specific ergonomic design of the mouth seal to push easily into the soft tissue of a user's face around the user's teeth, a substantially air-tight seal is created that does not hinder the user's ideal pronunciation and intonation of verbs adjectives, pronouns and other words easily without stress on the areas of the lips used for pronunciation. Preferably, the apparatus is configured to fit securely over the ear and mouth of a user, without breaking the air tight seal between the mouth opening and mouth of a user and the seal between the ear opening and the ear of a user. Suitably, this is accomplished via positioning the apparatus at a metocervical angle in a range of fifteen and twenty five degrees relative to the face of a user. A preferable metocervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc measurements. This insures even/equal user pressure around the entire menton subnasale area (i.e., direct contact area of the entire perimeter of the product's face sound seal) and the center of the ear.

Figure 1:
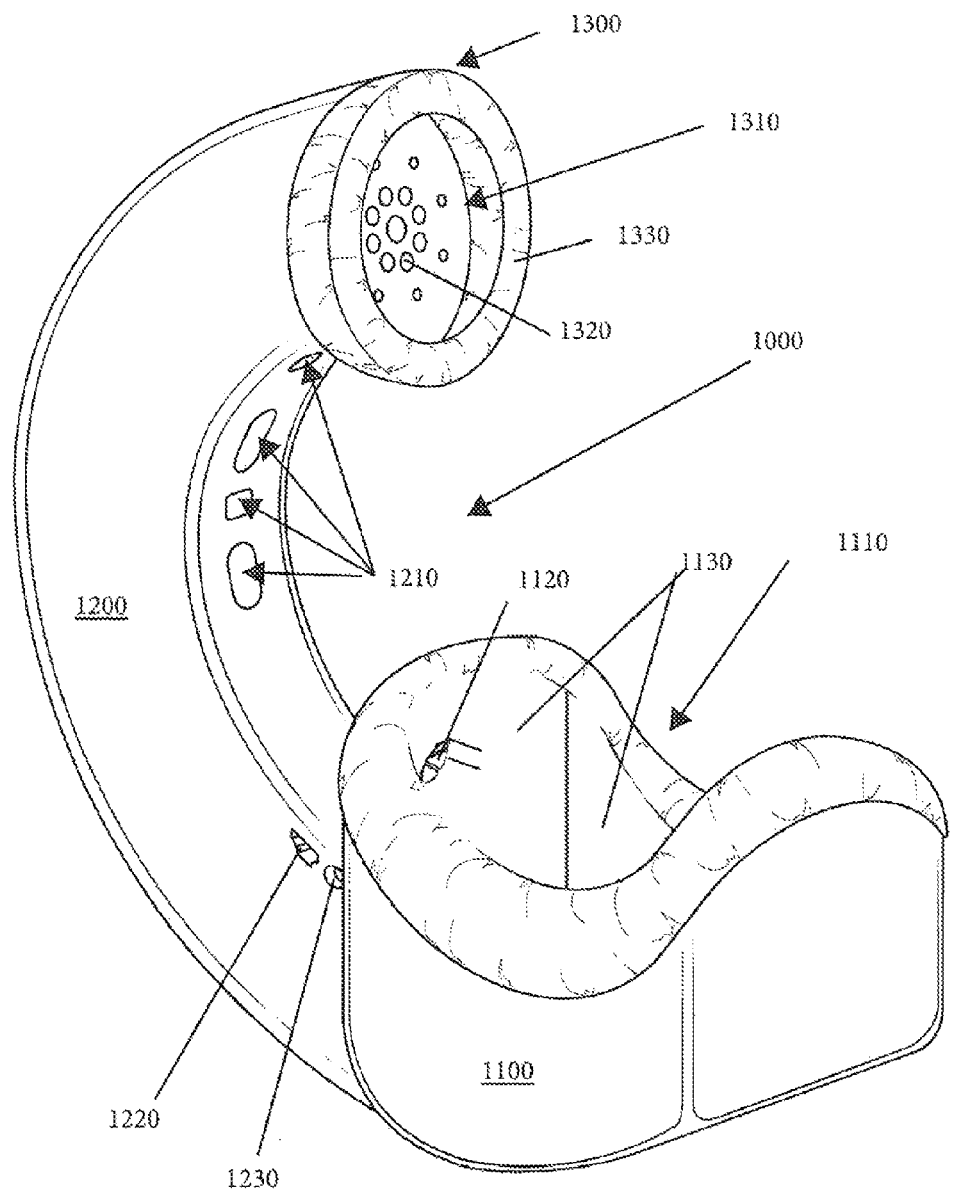
FIG. 1 is a perspective view of the device.

FIG. 1 is a perspective view of an apparatus 1000 for maintaining the privacy and clarity of communications made over a communication device. As shown, the apparatus 1000 is generally in the shape of a telephone handset and defined by: (1) an anechoic chamber 1100 with a mouth opening 1110 for engaging a mouth of a user; (2) a handle 1200; and, (3) an ear chamber 1300 with an ear opening 1310 for engaging the ear of a user.

As shown in FIG. 1, the handle 1200 is generally curved wherein: an anechoic chamber 1100 is generally positioned at the lower end of the handle 1200; and the ear chamber 1300 is positioned at an upper end of the handle. Both the anechoic chamber 1100 and the ear chamber 1300 generally define basins at either end of the handle 1000. The specifically designed anechoic chamber 1100 preferably features contours 1130 on its inner walls and cushioning 1140 around the lip of the mouth opening. Similarly, the ear chamber features cushioning 1330 around the lip of the ear opening 1310. Finally, the handle 1200 is configured with a curve so that it can be gripped by the hand of a user while the ear and anechoic chambers are simultaneously positioned over the ear and mouth. In a preferred embodiment, the handle has a curvature and shape of a banana fruit for the ergonomic use and comfort of a user. Although not shown, the handle 1200 may further feature grips to assist users with arthritis afflictions in holding the apparatus 1000.

As discussed in greater detail below, the apparatus 1000 is designed to receive and transmit telephone communications from and to a communication device (e.g., wirelessly via Bluetooth® type technology) or wired communication device (e.g., landline phone) and generally be operated in the manner of a telephone handset. For this reason, FIG. 1 depicts an air inlet 1120 within the anechoic chamber 1100. As discussed in greater detail below, the vent 1120 suitably features a triple layer air seal design that blocks ambient sounds from entering the anechoic chambers during a user's speech and that easily flexes under a negative pressure within the chamber 1100 to allow sufficient air into the chamber 1100 during speech. In other words, the vent 1120 makes it so the user does not have to pull away from the apparatus 1000 to breathe during use. Also depicted are (a) phone controls 1210 (e.g., volume and accept or decline buttons, hold button, or mute speaker button) on the handle 1200, power ports 1220 on the handle 1200, an audio port 1230 (e.g., for receiving a headphone jack), and speaker holes 1320 within the ear chamber 1300. In a preferred embodiment, the phone controls 1210 include a hold or mute button that will allow the user essentially turn off the phone when not engaged against the user's face to shield the listening party from the ambient noise or discussion of the user.

Figure 2:
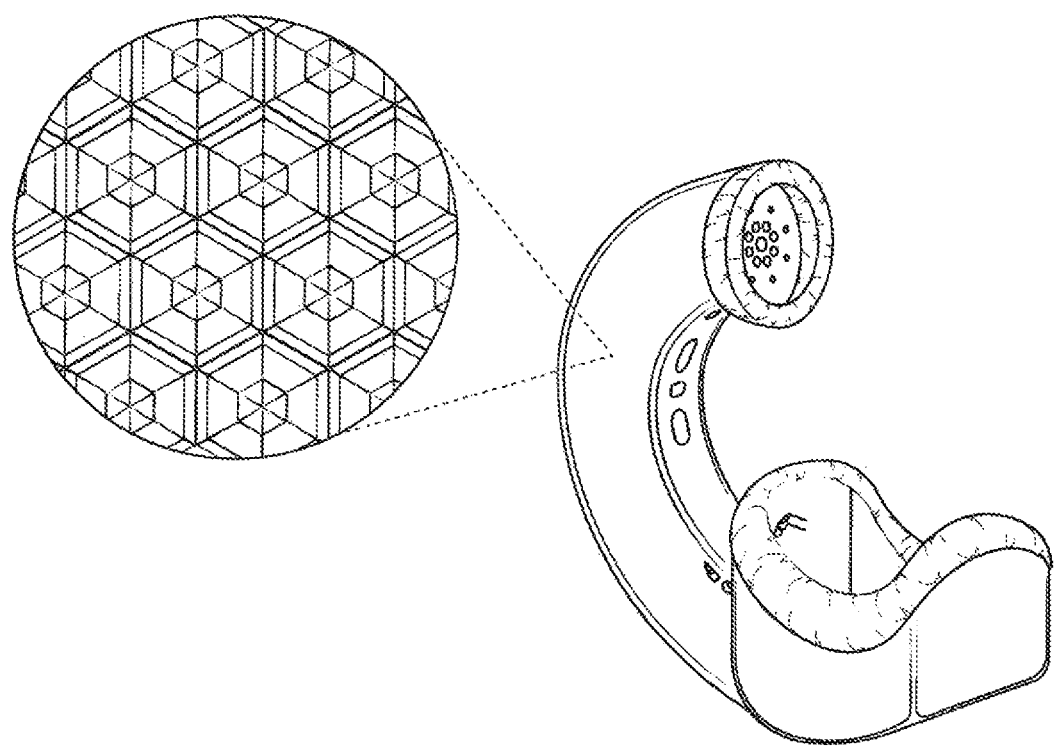
FIG. 2 is a perspective view of the device of FIG. 1 with a blow-out depicting the sound reflecting surface contours of the device.

FIG. 2 is a recreation of the perspective view of the apparatus 1000 FIG. 1, with an additional blow-out view to illustrate the external surface of the apparatus 1000. As shown in the blow-out view, the external surface of the apparatus is defined by a hex-skin or a plurality of hexagonal tiles positioned in an array over the surface of the apparatus 1000. In a preferred embodiment, each hexagon defines a plane or face for reflecting ambient sound energy, wherein each plane or face is angled on a lightly different angle relative to the plane of any adjacent hexagon within the skin. This angular offset from polygonal shapes results in ambient sound deflection to maintain the quality of sounds within the apparatus. Suitably, this angular offset weakens the ambient sound's intensity by not allowing sound energy to focus on a specific area on the surface of the outside of the anechoic chamber 1100. In a preferred embodiment, the surface of each hexagon is contoured to further disrupt ambient sounds via minimal absorption and deflection so that large focused sound energy cannot enter the anechoic chamber. Other polygonal patterns may be integrated.

Figure 3:
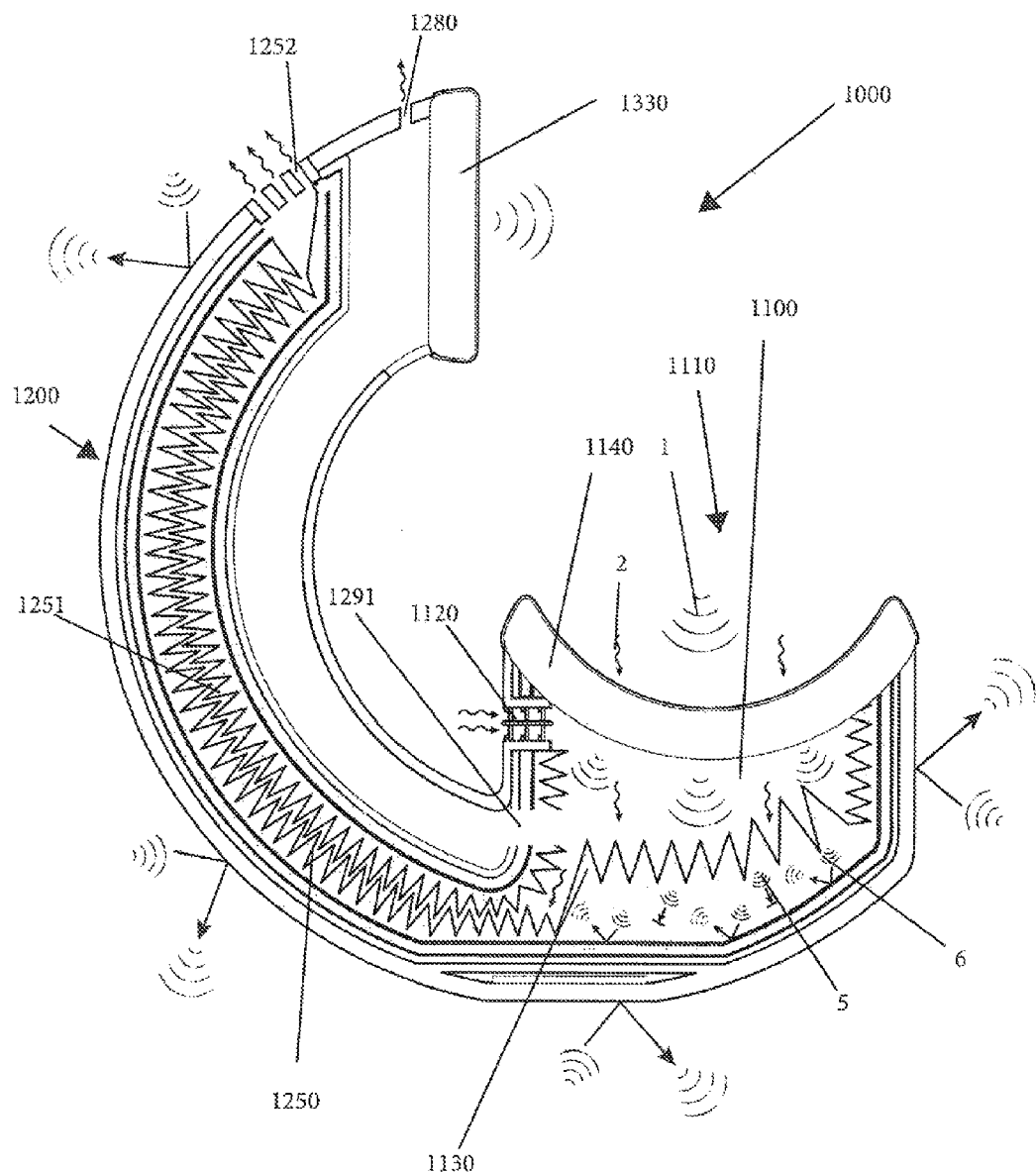
FIG. 3 is a cross section of an apparatus for ensuring the privacy and clarity of communications over communication devices.
Figure 4:
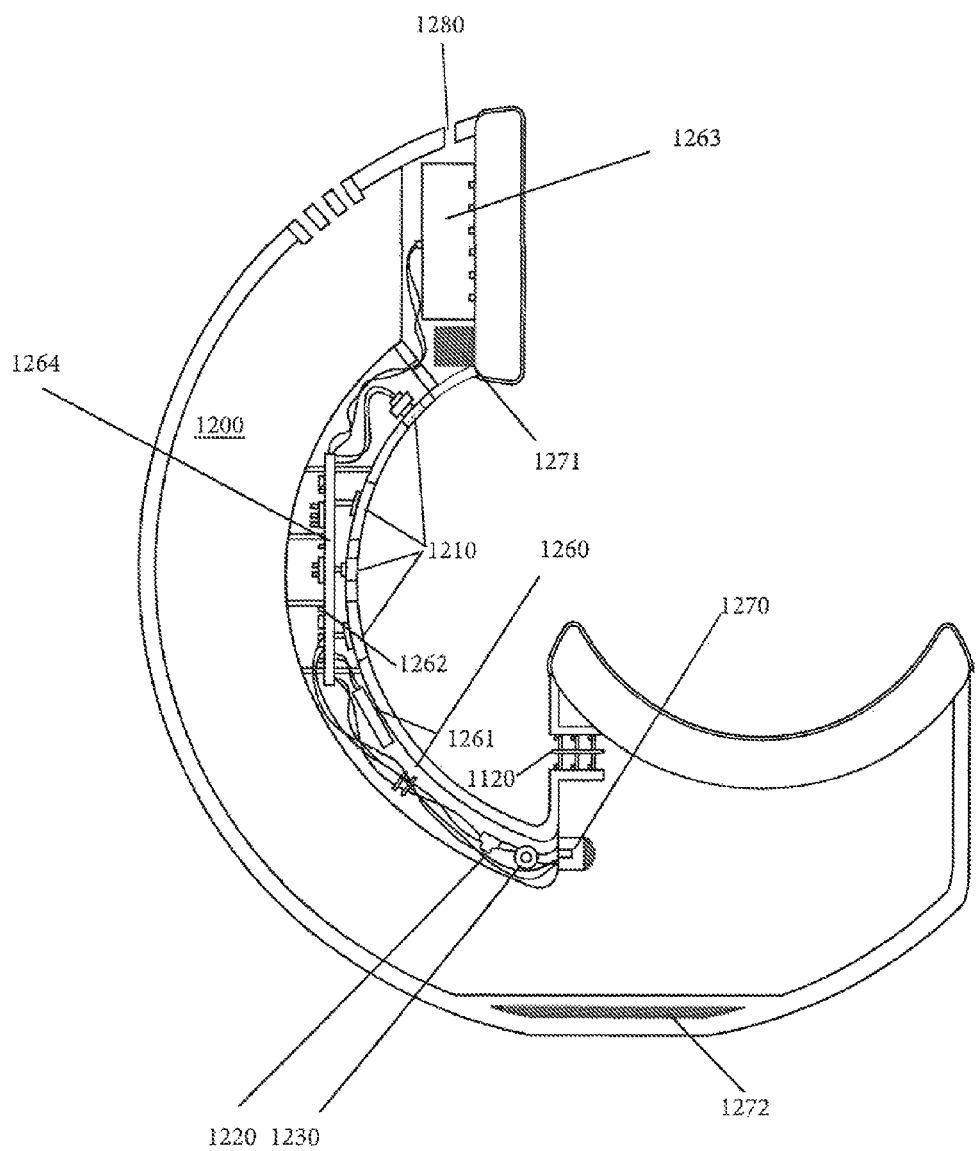
FIG. 4 is a cross section of the shell of the device showing isolated anechoic chambers separate from the electric components.

FIGS. 3 and 4 are cross-sections of the apparatus 1000 depicted in FIG. 1. These cross-sections are intended to illustrate the interior workings of the claimed device. Specifically, FIG. 3 illustrates the inner workings of the sound trapping, containing, absorbing, directing and deflecting components of the apparatus 1000 and FIG. 4 illustrates the electrical components for telephonic communications. Referring to both FIGS. 3 and 4, the phone electronics are, (apart from a microphone 1270) disposed within the acoustic chamber, and preferably isolated from sound absorbing components to ensure the sound components create a substantially or completely air-tight environment. As noted below in greater detail, the vent 1120 (FIG. 3) is positioned relative to the microphone 1270 (FIG. 4) so that flowing air upon fresh air-intake does not cause interference with the microphone 1270. Additionally, the vent 1120 should be flush with the external surface and positioned in the middle of the apparatus 1000 so that, when facing sound, the vent does not provide energy that may be reflected.

Referring first to FIG. 1 and FIG. 3, sound may be captured and/or absorbed or directed from the flow of air caused by speech during use of the apparatus 1000. In a preferred embodiment, sound energy 1 is captured or absorbed via the anechoic chamber 1100 and the anechoic channel 1250 disposed within the handle 1200. Suitably, the anechoic chamber 1100 is adapted to capture air 2 containing sound energy generated by a sound source (not shown), and distribute the air 2 over the inner surface of the chamber 1100 and through the anechoic channel 1250 (i.e., the channel 1250 provides fluid communication between the anechoic chamber 1100 and the ambient). The amount of air 2 being passed over the vocal cords is directly proportionate to voice sound volume.

Still referring to the same figures, the anechoic chamber 1100 features a vent 1120. The vent 1120 is provided so that (a) air may be supplied to the user without disengaging the device from the users face mouth and ear whereby a substantially air-tight seal may remain between the anechoic chamber 1100 and a user's face. The vent 1120 opens under negative pressure within the chamber. The vent 1120 closes under the positive pressure caused by a sound source within the chamber 1100. This inlet preferably allows air 2 to pass into the anechoic chamber 1100. In a preferred embodiment, the inlet is defined by a vent 1120 with triple rubber flex valves in a naturally closed position. The triple valve provides ambient sound insulation/shielding during speech. The rubber flex values easily open when a breath of fresh air is needed to breathe while speaking. As shown in FIG. 3 and FIG. 1, the anechoic chamber 1100 features contours 1130 for increasing the surface area of its internal sidewalls. Preferably, these peak contours 1130 are a specific shape to enhance the absorption of low base megahertz frequencies. Further surface area is provided via placing small holes or pores in the contours 1130. In the depicted embodiment those contours 1130 are defined by wedges or ridges. Suitably, similar pored contours 1251 may be provided to the inner walls of the anechoic channel 1250. As shown, the contours 1251 cooperate to guide energized air (energized with near field sound energy that was not absorbed or contained in the anechoic chamber 1100) over its surface area and around corners to physically make the air lose sound wave energy. In a preferred embodiment, the anechoic chamber 1100 and channel 1250 is provided with an air vent 1252 through the handle 1200 so that air that has been de-energized of sound energy may be exhausted to the ambient atmosphere. As shown, the exhausted air 2 from the vent 1252 is directed away from the ear chamber 1300 so that if any sound energy remains in the air, the remnant energy will be directed away from the ear chamber 1300 (FIG. 1) and its speaker.

Still referring to FIGS. 1 and 3, the sidewalls of the anechoic chamber 1100 and anechoic channel 1250 are configured to trap, contain, absorb, direct, and deflect sound energy from air that contacts its surface area. For this purpose, the sidewalls of the anechoic chamber 1100 and channel 1250, the sidewalls are constructed of dense open cell acoustic foam for maximum energy absorption and dissipation. When air contains large amounts of sound energy, some of that energy will inevitably propagate through materials designed to absorb the energy and potentially be released to the ambient atmosphere. In view of this fact, the sidewalls preferably feature layers with various acoustical properties (including energy densities) for further sound absorption and reflection of sound energy back toward the inside of the anechoic chamber 1200 and the user's face. These layers are depicted in FIG. 5, which is a cross section of a typical sidewall.

Figure 5:
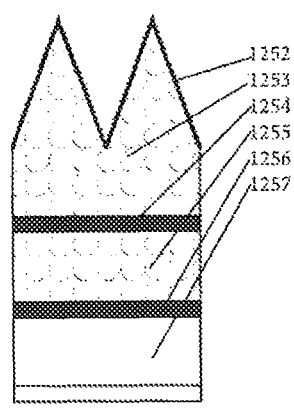
FIG. 5 is a cross section of a side wall of an anechoic chamber.

Referring to FIGS. 5 and 3, the inner walls of the anechoic chamber 1100 and the anechoic channel 1250 are suitably constructed in layers. As shown in FIG. 5: a first layer 1252 may be defined by an anti-microbial sound absorbent coating to maximize bass dampening while not allowing the surfaces in contact with the users salvia to become ridden with bacteria; a second layer 1253 comprised of dense open cell acoustic foam defining the pored contours 1130 and 1251 of the chamber 1100 and channel 1250; a third layer 1254 for defined by a composite (e.g., modeling clay that will not shrink or dry always staying permeable) or foil/metal (e.g., aluminum foil or light gauge sheet metal) for absorbing, deflecting and reflecting energy back to within the anechoic chamber and thru to the channel up to the exhaust; a fourth layer 1255 of dense open cell acoustic foam; a fifth layer 1256 of a composite or foil/metal or clay for absorbing and or reflecting energy; a sixth layer 1257 of large, open cell plastic; and the outer shell of the apparatus 1000. As shown in FIGS. 3 and 5, sound energy 5 is absorbed by the second layer 1253 and, if not, the energy 6 is reflected by the third layer 1254. The second and third layers are important to function because if energy is not adsorbed by the second layer 1253 it is reflected by the third layer 1254. The configuration of functional specific layers of coatings, open cell foam, sheet metal, modeling clay, rubber layers is specifically designed to absorb, contain, reflect and direct the different ranges of frequencies/wavelengths of the sound waves from and male and female speaking, singing and playing a musical instrument, and therefore the combination of these layers, or sets of layers (example: modeling clay backed by thin metal), work to maximize all sound energy absorption and prevent the sound energy from escaping the device.

Referring now to FIG. 4, the upper portion of the handle 1200 features a housing 1260 for retaining the electronics that enable the apparatus to be used in the manner of a telephone handset. This housing 1260 further allows for sound vibration isolation from the anechoic chambers 1100 and sub assembly for manufacturing. This configuration allows the anechoic chamber 1100 to be easily assembled in a substantially air tight manner, which may be important to operation of the device. The electronic separation is also needed to direct and expel the electronic heat from the device. As shown, the housing 1260 retains a battery 1261, a mother circuit board 1262 that is electrically coupled to the phone controls 1210 (including volume controls, on/off controls, and hold microphone button controls), a speaker 1263, a microphone 1270 that is specifically designed to function in a positive air pressure environment, and a receiver/transmitter 1264 (e.g., Bluetooth®) (which may be coupled to the mother circuit board 1262 for receiving and transmitting communications to and from a device (e.g., cell phone, two way radio, or home phone). To vent the naturally occurring build-up of heat from electronic operations, the housing 1260 is outfitted with a vent 1280 for venting heat from the housing 1260. This isolated vent 1280 also allows the devices audio speaker to naturally flex its speaker membrane for clear sound amplification. These phone electronics are configured to operate in the manner of a Bluetooth® or other wireless headset for mobile, home, or office communication devices. The jack 1230 is preferably a 3.5 mm industry standard headphone jack so the device can be wired (linked) to a cell phone without bluetooth. In such configurations the blue tooth components will either be off or not located in the device. As shown, the microphone 1270 is positioned within the anechoic chamber from the housing 1260 so that no salvia generally comes in contact with the users "salvia spray" while speaking. The microphone 1270 is also positioned so no air from the intake will not cause "noise" air flow interference from incoming air when the user breathes. Suitably, the microphone 1270 is configured for use within a pressurized chamber and with an air tight seal between the anechoic chamber 1100 and the housing 1260. In other words, the microphone 1270 is specifically designed to function in a positive air pressure environment. The microphone 1270 may preferably be passed through a housing 1260 via opening 1291 (see FIG. 3). Again, this specific position allows for isolation from the majority of the sound vibrations and also to aid in sub manufacturing assembles. Finally, weights 1271 and 1272 may be positioned at the upper and lower portions of the apparatus 1000 for balance.

Figure 6:
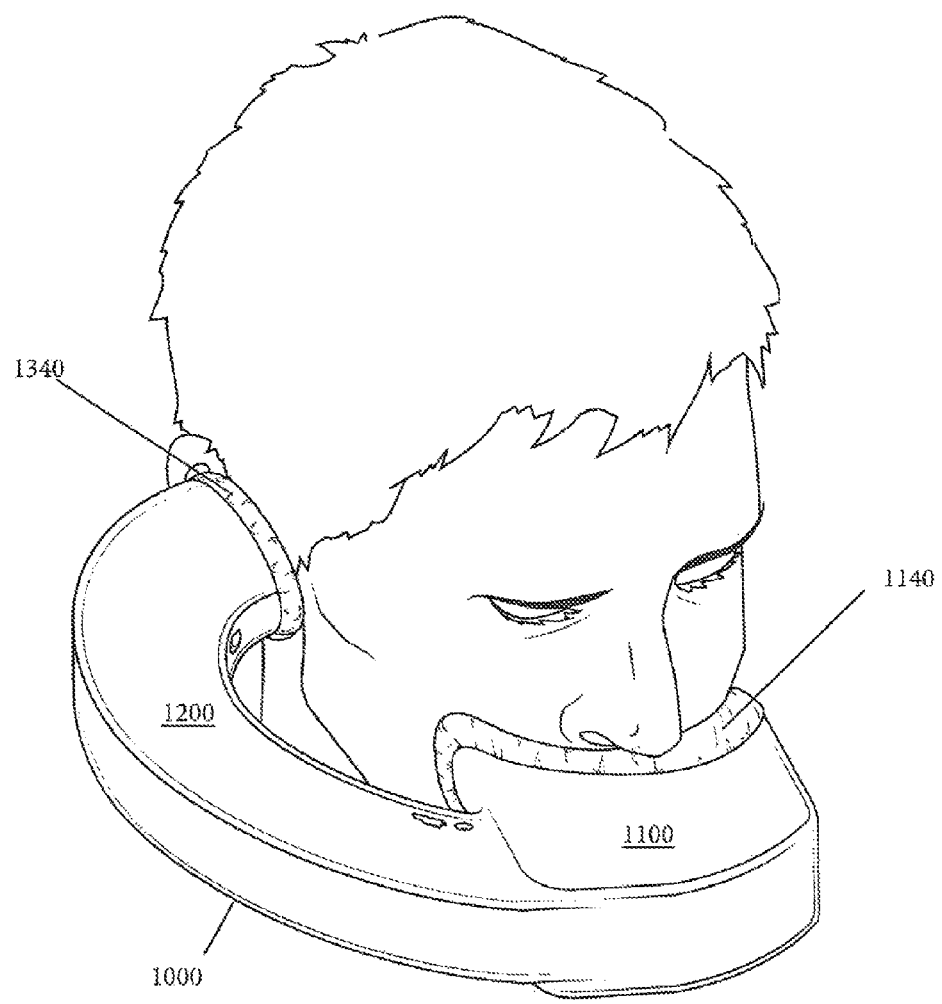
FIG. 6 is an environmental view of the device.
Figure 13:
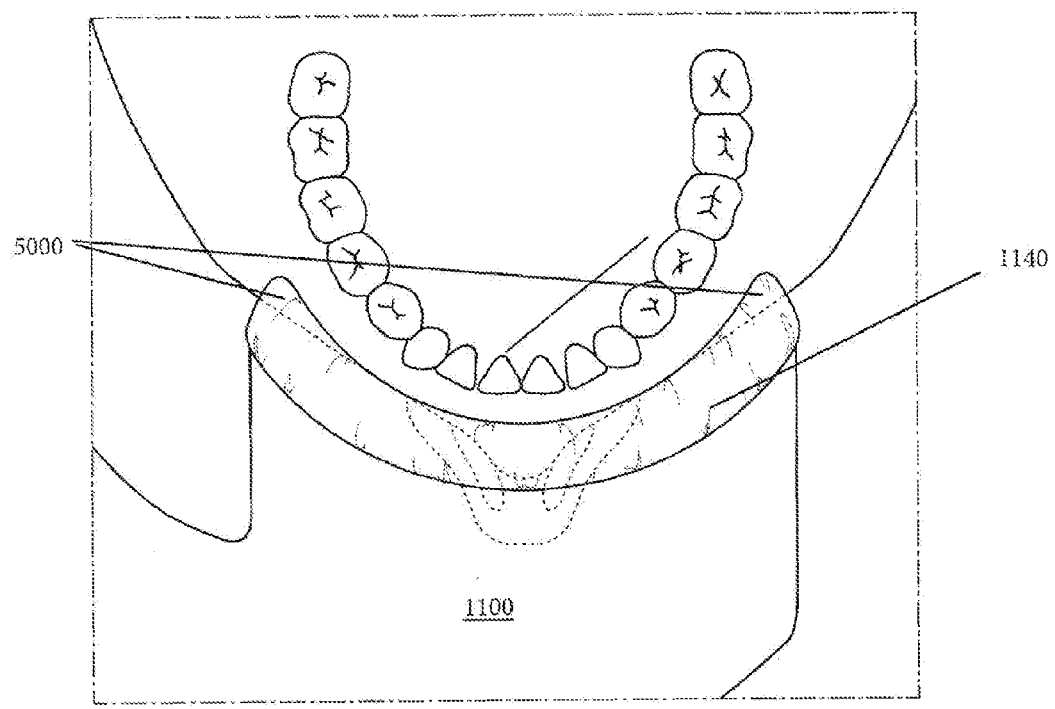
FIG. 13 is an environmental view of the apparatus of FIG. 1, in use.

As alluded to above, the apparatus 1000 is designed to be operated in the manner of a telephone handset. FIG. 6 shows an environmental view of the apparatus 1000 in operation. As shown, the apparatus 1000 is operated via placing (1) the mouth opening 1110 securely over the mouth of a user so that the cushioning 1140 or flexible rubber seal of the device 1000 is firmly and comfortably positioned around the mouth of the user and (2) the ear opening 1310 over the ear of a user so that the cushioning 1330 is firmly positioned around or over the ear of a user. Suitably, the anechoic chamber cushioning 1140 or flexible rubber seal is configured to act as an air-tight gasket between the interface of the mouth and anechoic chamber 1100. In one embodiment, the cushioning may be removable, disposable, and replaceable to avoid build-up of dirt, bacteria and other substances that may accumulate during use. FIG. 13 illustrates the positioning of the device 1000 over the mouth. Suitably, the mouth opening is generally mouth shaped and curved so that it may be pressed around the mouth of a user and into the soft tissue 5000 (the area indicated by dashed lines) of the face. In a preferred embodiment, the mouth opening must engage the soft tissue of the face so that the mouth piece pushes softly into the face without interfering with the lips so the user has no difficulties speaking and singing normally. This engagement creates a substantially air-tight seal around the mouth of a user and allows the ear chamber 1300 to be properly positioned over the ear. The ear chamber 1300 cushioning 1330 is configured to act as a gasket between the interface of the ear and ear chamber 1200.

Preferably, the apparatus is configured to fit securely over the ear and mouth of a user, without breaking the air tight seal between the mouth opening 1110 and mouth of a user and the seal between the ear opening 1310 and the ear of a user. Suitably, this is accomplished via positioning the apparatus at a metocervical angle in a range of fifteen and twenty five degrees relative to the face of a user. Other embodiments need not incorporate these angles. A preferable metocervical angle position for the apparatus is about nineteen degrees for female users and about twenty three degrees for male users. These metocervical angle positions result in the appropriate ear to mouth engagement at an eighty-eighth percentile relationship for both of the bitragoin sub-nasal arc and the bitragion-menton arc anthropometric measurements. This insures even/equal user pressure around the entire menton subnasale area (i.e., direct contact area of the entire perimeter of the product's face sound seal) and the center of the ear.

Figure 12:
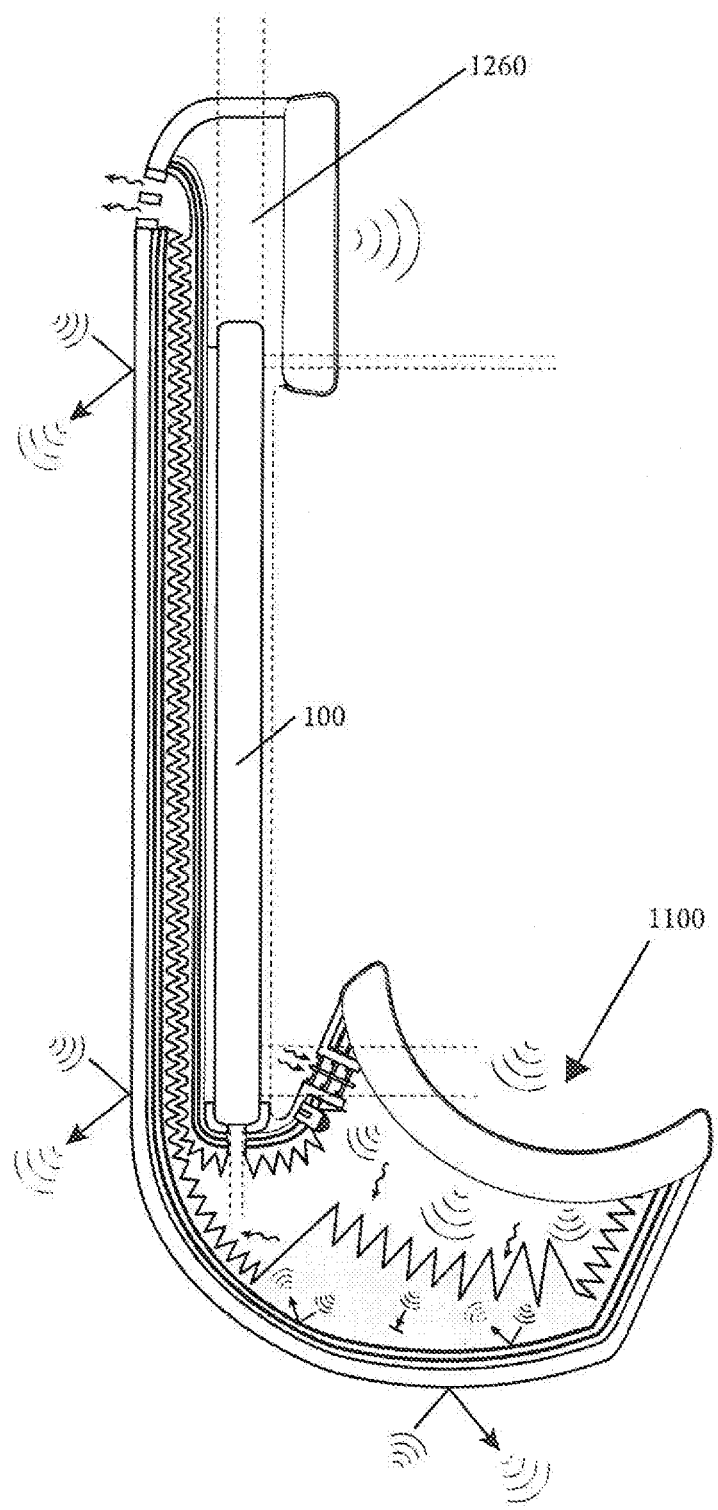
FIG. 12 is a cross-section of an alternate embodiment of the device of FIG. 1.

In another embodiment, a device can include an anechoic chamber 1100 configured to attach to a conventional phone device. FIG. 12 illustrates a cross section of such an embodiment of the apparatus 1000. In this embodiment, a cellular phone 100, such as an iPhone®, may be provided into the apparatus 1000 housing 1260 for retaining the electronics. The shape of the handle 1200 will have to be modified depending on the type of phone being provided to the housing 1260.

Figure 7:
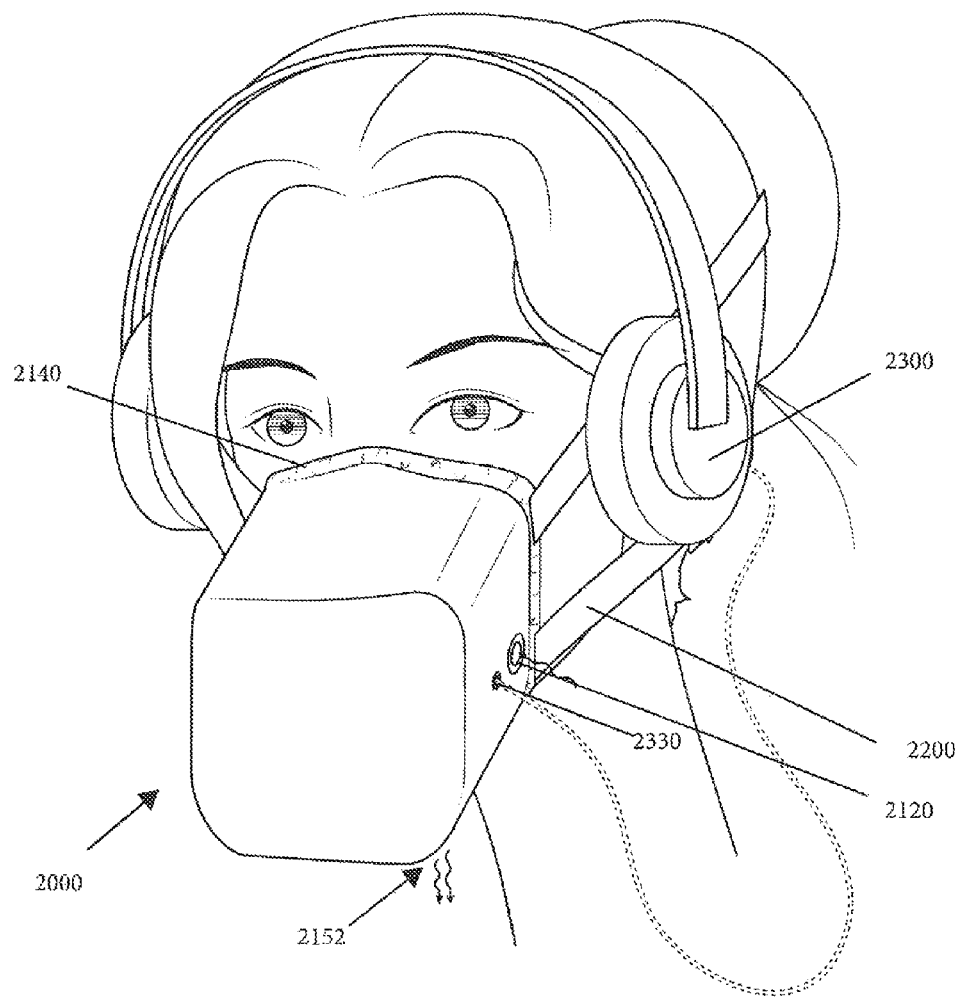
FIG. 7 is a perspective and environmental view of the device.
Figure 8:
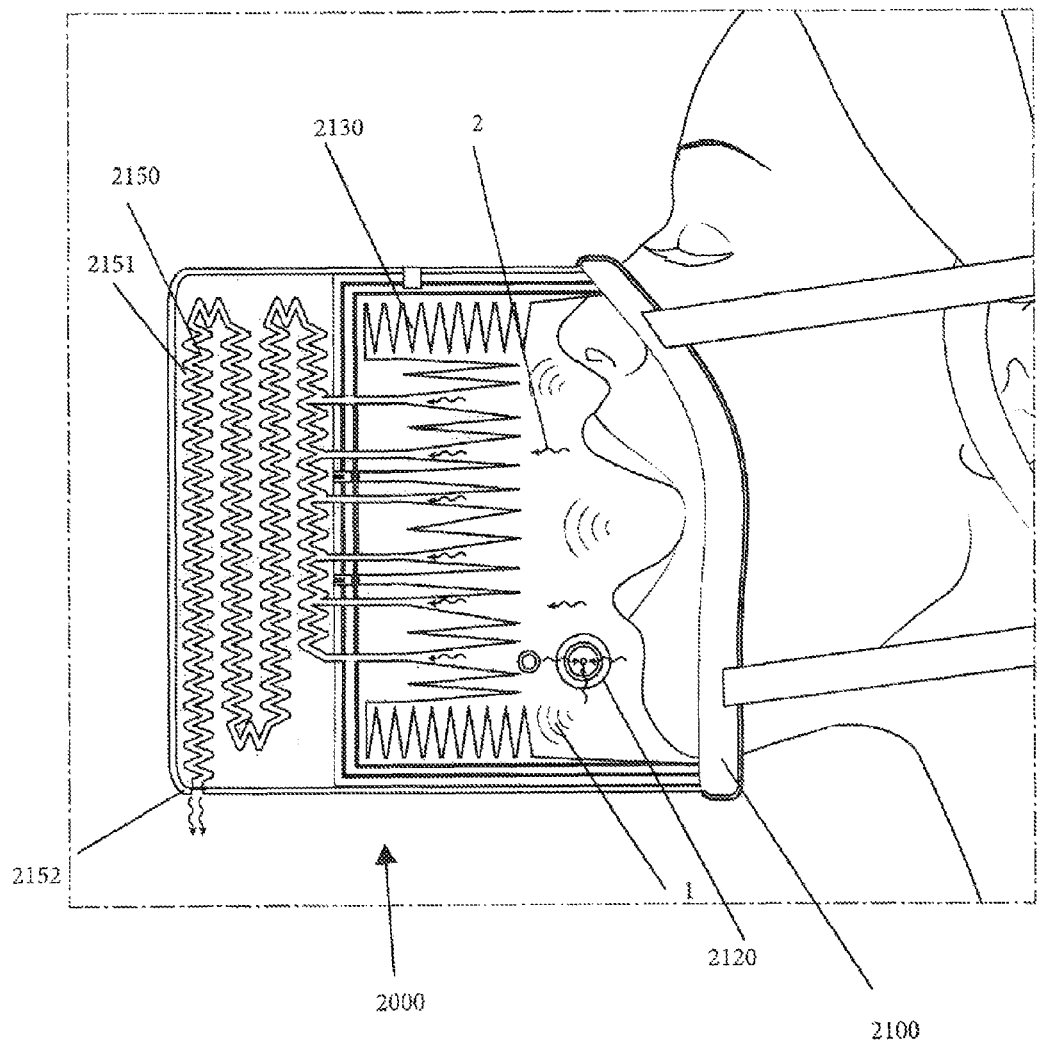
FIG. 8 is a cross section and environmental view of a device for maintaining the privacy of a singer's voice.

FIG. 7 is a perspective and environmental view of an apparatus 2000 for maintaining the privacy of sound produced by a singer. FIG. 8 is a cross section of apparatus of FIG. 7. As shown, the apparatus 2000 is generally in the shape of a mask and defined by: (1) an anechoic chamber 2100 with a mouth opening 2110 for engaging a mouth of a user; (2) straps 2200 securing the mask to the face of a user, and (3) external ear phones 2300.

Referring to FIG. 7 and FIG. 8, sound may be captured and or absorbed during use of the apparatus 2000. In a preferred embodiment, sound energy 1 is captured or absorbed via the anechoic chamber 2100 and the anechoic channel 2250 disposed adjacent to the chamber 2100. Suitably, the anechoic chamber 2100 is adapted to capture air 2 containing sound energy generated by a sound source (e.g., a singer), and distribute the air 2 over the inner surface of the chamber 2100 and through the anechoic channel 2250 (i.e., the channel 2250 provides fluid communication between the anechoic chamber 2100 and the ambient atmosphere). So that air may be energized with sound from within the anechoic chamber 2100, the anechoic chamber 2100 features an air inlet 2120. This inlet preferably allows air 2 to pass into the anechoic chamber 2100. In a preferred embodiment, the inlet is defined by a vent 2120 with double rubber flex valves in a naturally closed position. The vent 2120 closes under the positive pressure caused by a sound source within the chamber. As shown in FIG. 7, the anechoic chamber 2100 features contours 2130 for increasing the surface area of its internal sidewalls. Further surface area is provided via placing small holes or pores in the contours. In the depicted embodiment those contours are defined by wedges or ridges. Suitably, similar contours 2251 may be provided to the inner walls of the anechoic channel 2250. In a preferred embodiment, the anechoic channel 2250 is provided with an air vent 2252 through the apparatus 2000, so that air that has been de-energized of sound energy may be exhausted to the ambient atmosphere. Finally, the apparatus 2000 features audio output mechanisms 3300 for providing the sound to the earphones 2300 (FIG. 8). Suitably, the straps 2200 are engaged with a sufficient pressure to secure the mouth opening over the entire menton-nasal root area (i.e., direct contact area of the entire perimeter of the products face sound seal). All other aspects operate in the same or analogous manner as those described above in connection with earlier embodiments.

Figure 9:
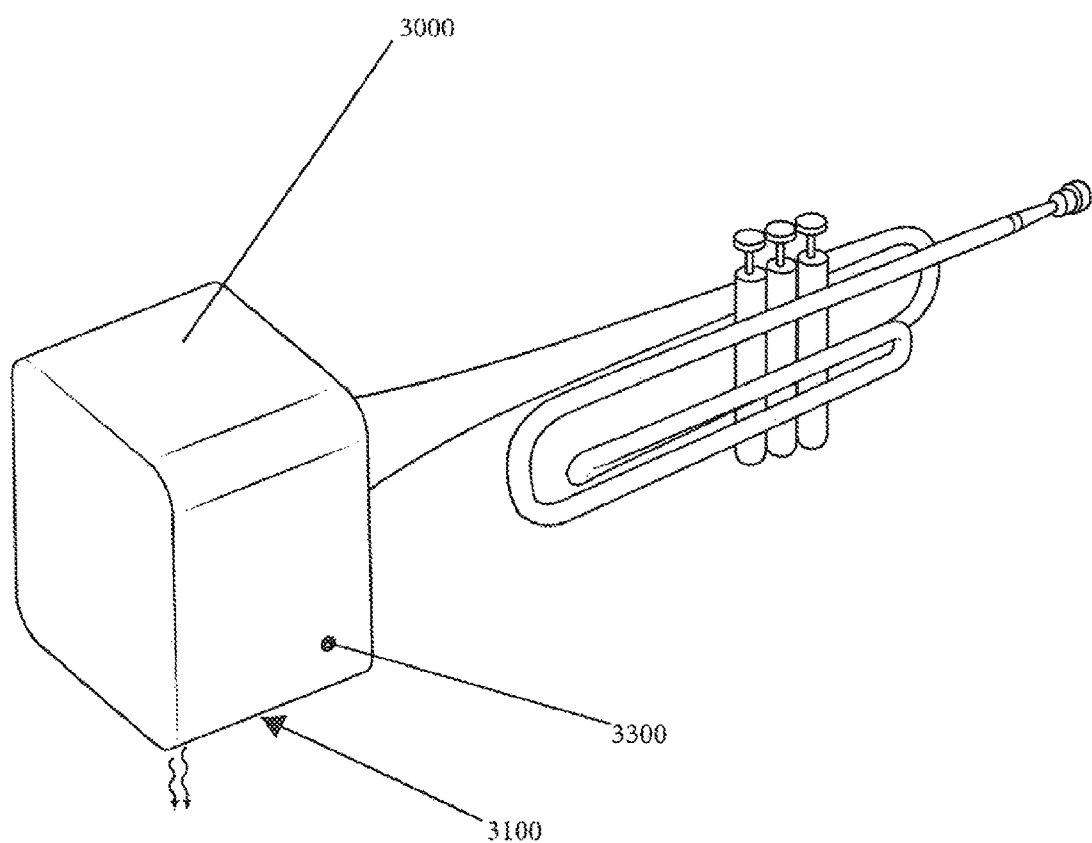
FIG. 9 is a perspective and environmental view of the apparatus.
Figure 10:
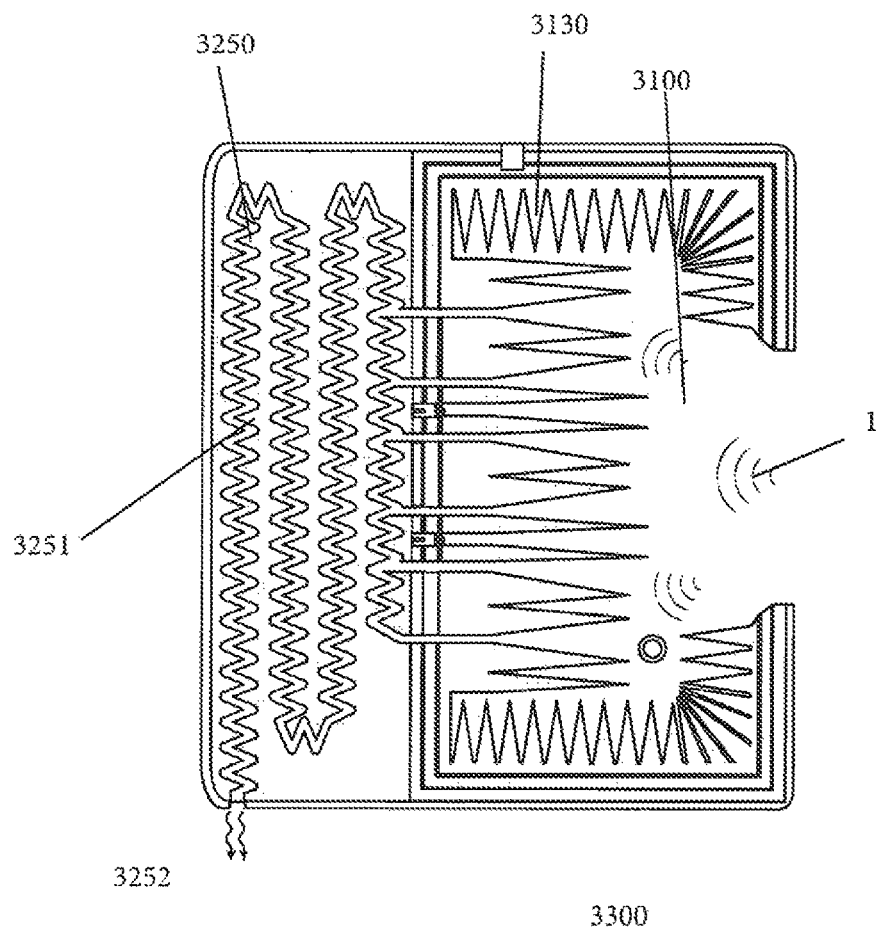
FIG. 10 is a cross section of an apparatus for ensuring the privacy of sounds generated via a woodwind instrument.

FIG. 9 is a perspective and environmental view of an apparatus 3000 for maintaining the privacy of sound produced by a woodwind instrument. FIG. 10 is a cross section of apparatus of FIG. 9. As shown, the apparatus 3000 is generally in the shape of a box and defined by an anechoic chamber 3100 with an opening 3110 for engaging a woodwind instrument. FIG. 10 illustrates the inner workings of the sound capturing and/or dissipating components of the apparatus 3000.

Referring to FIG. 9 and FIG. 10, sound may be captured and or absorbed during use of the apparatus 3000. In a preferred embodiment, sound energy 1 is captured or absorbed via the anechoic chamber 3100 and the anechoic channel 3250 disposed adjacent to the chamber 3100 Suitably, the anechoic chamber 3100 is adapted to capture air 2 containing sound energy generated by a sound source (e.g., a woodwind instrument), and distribute the air 2 over the inner surface of the chamber 3100 and through the anechoic channel 3250 (i.e., the channel 3250 provides fluid communication between the anechoic chamber 3100 and the ambient).

Figure 11:
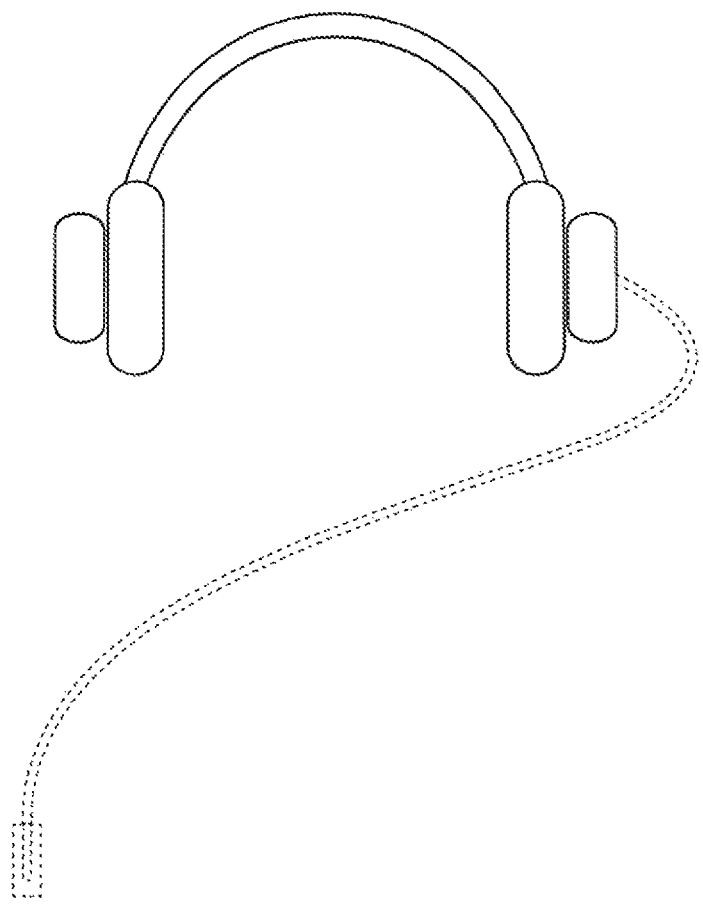
FIG. 11 is a view of headphones for use with the device of FIGS. 7 and 9.

As shown in FIG. 9, the anechoic chamber 3100 features contours 3130 for increasing the surface area of its internal sidewalls. Further surface area is provided via placing small holes or pores in the contours. In the depicted embodiment those contours are defined by wedges or ridges. Suitably, similar contours 3251 may be provided to the inner walls of the anechoic channel 3250. In a preferred embodiment, the anechoic chamber 3250 is provided with an air vent 3252 so that air that has been de-energized of sound energy may be exhausted to the ambient. Finally, the apparatus features audio output mechanisms 3300 for providing the sound to the earphones 2300 (FIG. 11). All other aspects are configured or operate in the same or analogous manner as those described above in connection with earlier embodiments.

Further disclosed, in general, are devices that provide a substantially sound-tight suppressor chamber over a sound source while trapping, containing, absorbing, directing and deflecting fields of sounds from the sound source (e.g., the mouth of a human). In general, the devices feature: a specialized suppressor chamber that is configured to receive a sound source in a substantially sound-tight manner (meaning only allowing muffled unintelligible escape of sound); and a specialized suppressor channel that is in fluid communication with the ambient atmosphere. Suitably, the suppressor chamber is adapted to capture air containing sound energy generated by the sound source, and direct the air to the suppressor channel to dampen or otherwise absorb the sounds energy. More specific details of alternate embodiments are disclosed in connection with FIGS. 14 through 17C.

Figure 14:
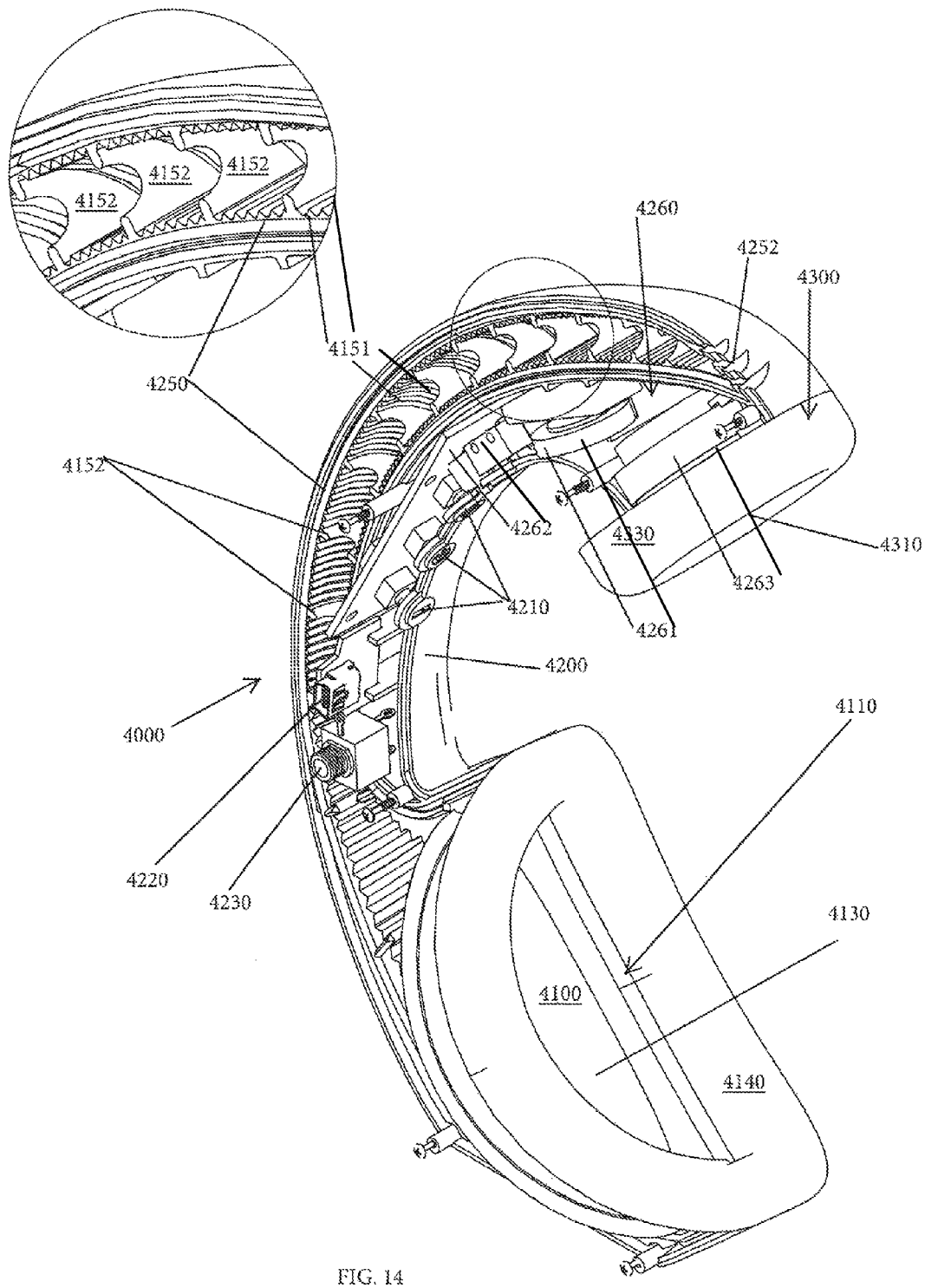
FIG. 14 is a cross-section view of an alternate embodiment of a device that uses baffles to muffle or otherwise change the signature of sound.

FIG. 14 is a perspective cross section view of an apparatus 4000 for maintaining the privacy and clarity of communications made over a communication device. As shown, the apparatus 4000 is generally in the shape of a telephone handset and defined by: (1) a suppresser chamber 4100 with a mouth opening 4110 for engaging a mouth of a user (not shown); (2) a handle 4200; and, (3) an ear chamber 4300 with an ear opening 4310 for engaging the ear of a user.

As shown in FIG. 14, the handle 4200 is generally curved wherein: a suppresser chamber 4100 is generally positioned at the lower end of the handle 4200; and the ear chamber 4300 is positioned at an upper end of the handle 4200. Both the suppressor chamber 4100 and the ear chamber 4300 generally define basins at either end of the handle 4200. The specifically designed suppressor chamber 4100 preferably features a foam insert 4130 and cushioning 4140 around the lip of the mouth opening 4110. Similarly, the ear chamber 4300 features cushioning 4330 around the lip of the ear opening 4310. Finally, the handle 4200 is configured with a curve so that it can be gripped by the hand of a user (not shown) while the ear and suppressor chambers (4100, 4300) are simultaneously positioned over the user's ear and mouth. In a preferred embodiment, the handle 4200 may have a curvature and shape of a banana fruit for the ergonomic use and comfort of a user. Although not shown, the handle 4200 may further feature grips to assist users with arthritis afflictions in holding the apparatus 4000. Lower profile shapes are also contemplated.

As with earlier embodiments described above, the apparatus is configured to fit securely over the ear and mouth of a user, without substantially breaking the sound-tight seal between the mouth opening and mouth of a user and the seal between the ear opening and the ear of a user. Suitably, this is accomplished via positioning the apparatus at a metocervical angle in a range of fifteen and twenty five degrees relative to the face of a user. A preferable mentocervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc measurements. This insures even/equal user pressure around the entire menton subnasale area (i.e., direct contact area of the entire perimeter of the product's face sound seal) and the center of the ear.

As discussed in greater detail below, the apparatus 4000 is designed to receive and transmit telephone communications from and to a communication device (e.g., wirelessly via Bluetooth® type technology) or wired communication device (e.g., landline phone) and generally be operated in the manner of a telephone handset. Also depicted are phone controls 4210 (e.g., volume and accept or decline buttons, hold button, or mute speaker button) on the handle 4200, power ports 4220 on the handle 4200, an audio port 4230 (e.g., for receiving a headphone jack), and speaker holes (not shown) within the ear chamber 4300. In a preferred embodiment, the phone controls 4210 include a hold or mute button that will allow the user essentially turn off the phone when not engaged against the user's face to shield the listening party from the ambient noise or discussion of the user.

Figure 15:
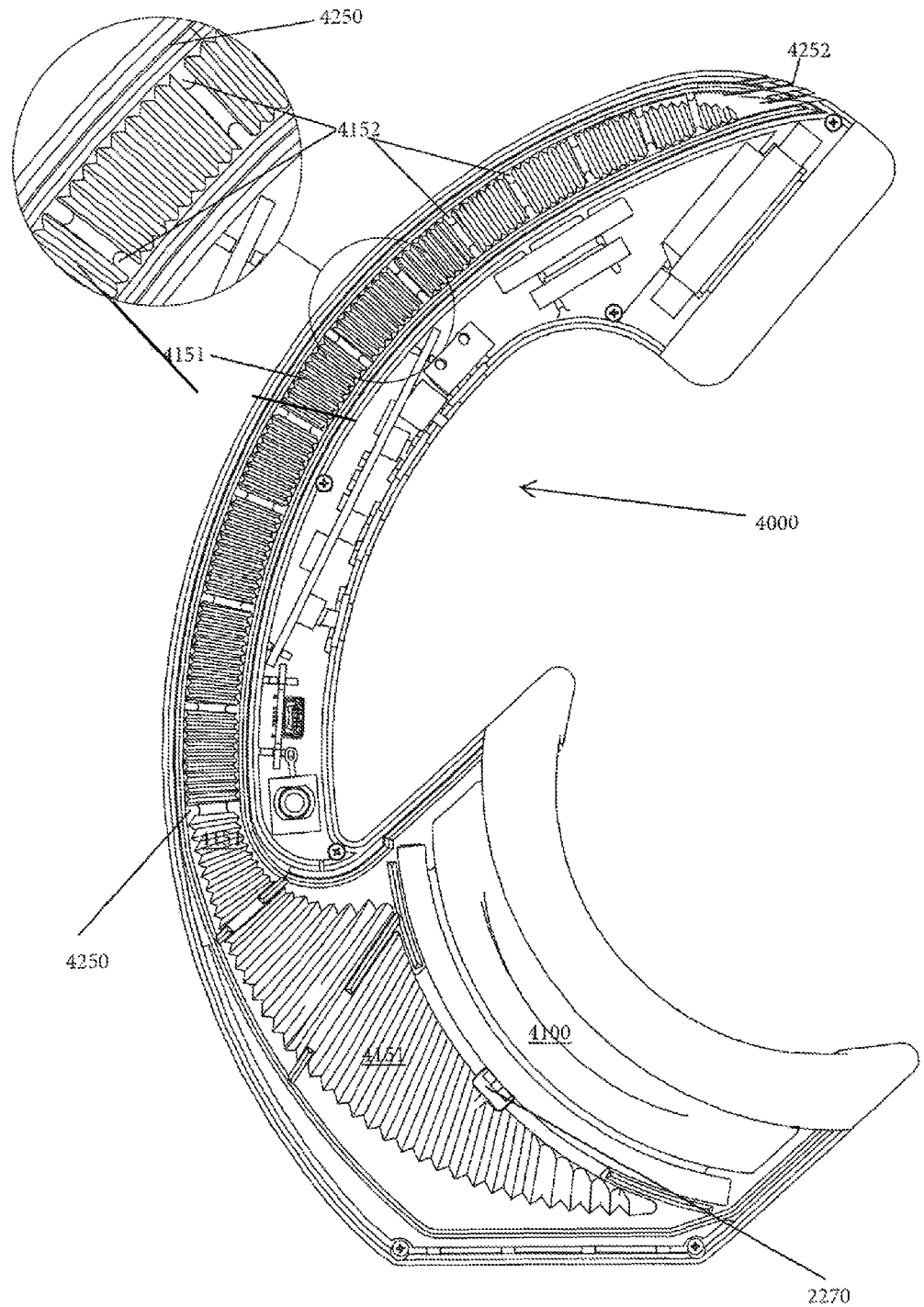
FIG. 15 is a cross-section view of the embodiment of the device of FIG. 14.

FIG. 15 is a cross-section of the apparatus 4000 of FIG. 14. The cross-sections of FIGS. 14 and 15 are intended to illustrate the interior workings of the claimed embodiments. Specifically, the figure illustrates certain inner workings of the sound trapping, containing, absorbing, directing and deflecting components of the apparatus 4000 and the electrical components for telephonic communications. Referring to both figures, the phone electronics are, (apart from a microphone 4270) disposed within the acoustic chamber, and preferably isolated from sound absorbing components to ensure the sound components create a substantially or completely sound-tight environment.

Still referring to FIGS. 14 and 15, sound may be captured and/or absorbed or directed from the flow of air caused by speech during use of the apparatus 4000. In a preferred embodiment, sound energy is captured and absorbed/dissipated via the suppressor channel 4250 disposed within the handle 4200. Suitably, the suppressor chamber 4100 is adapted to capture air containing sound energy generated by a sound source (not shown) and provide the air through the suppressor channel 4250 (i.e., the channel 4250 provides fluid communication between the suppressor chamber 4100 and the ambient).

Figure 16:
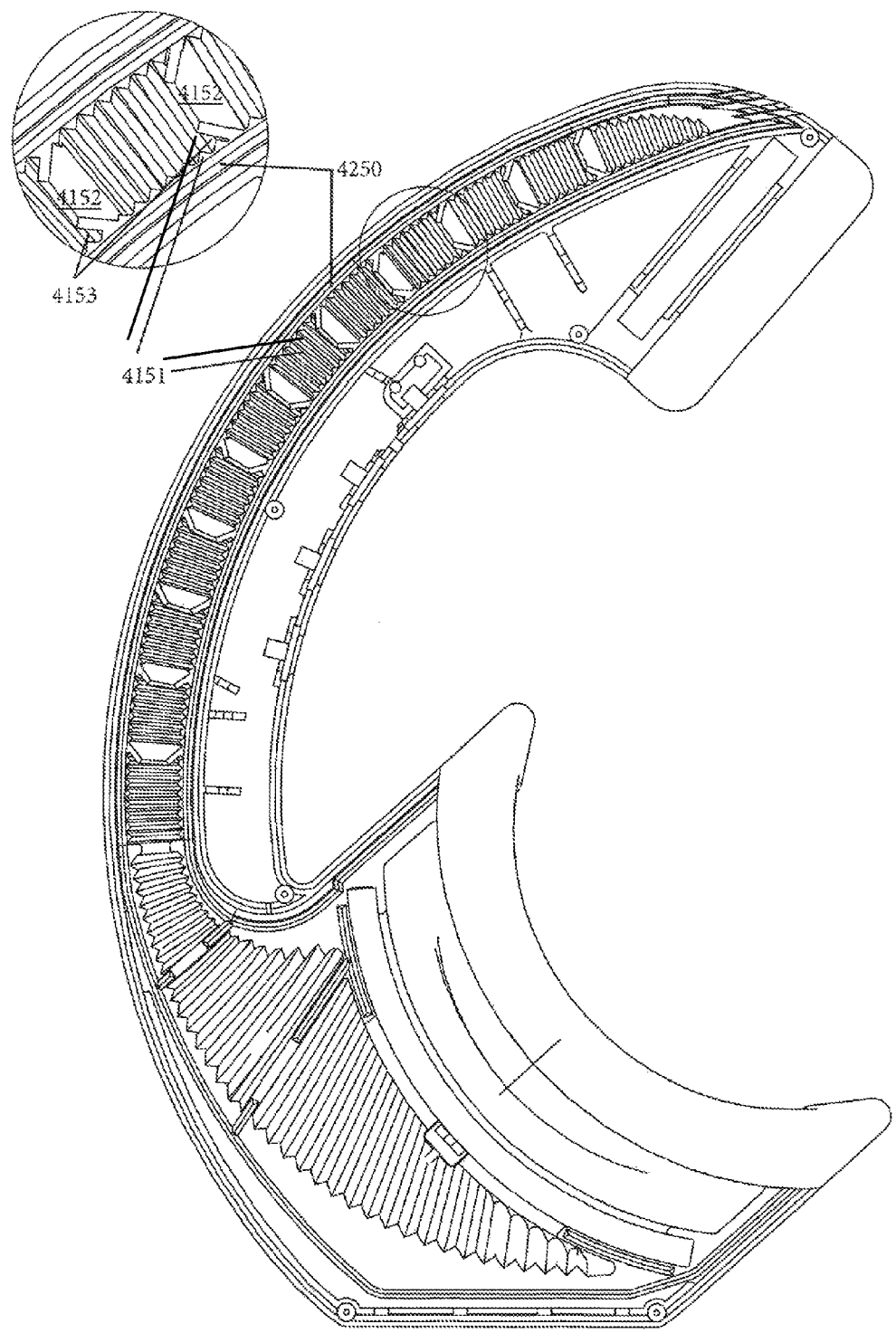
FIG. 16 is a cross-section of an alternate design of the embodiment shown in 14.
Figure 17A:
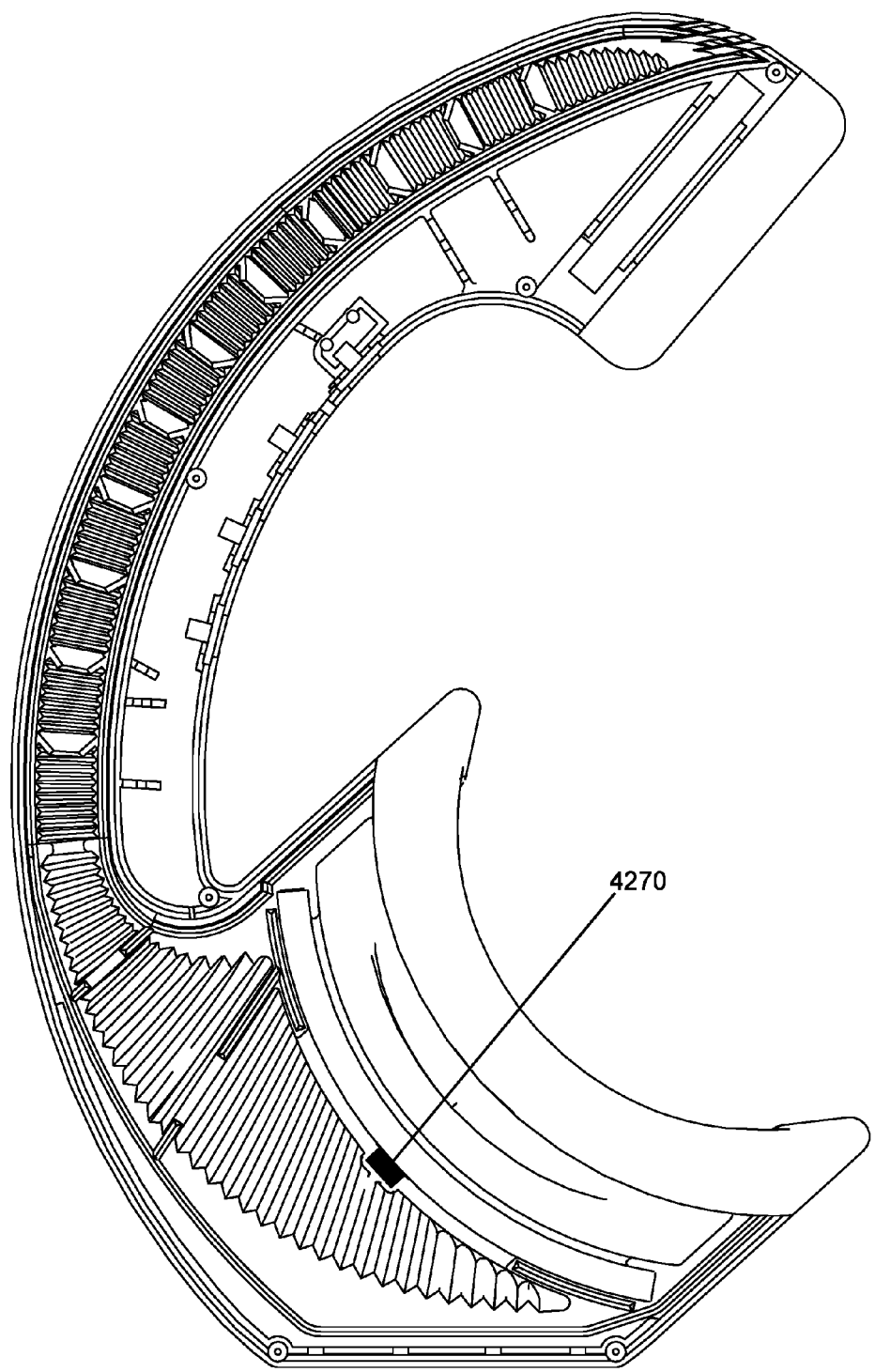
FIG. 17A is a cross-section of the embodiment shown in FIG. 14 with a microphone positioned in a first location.
Figure 17B:
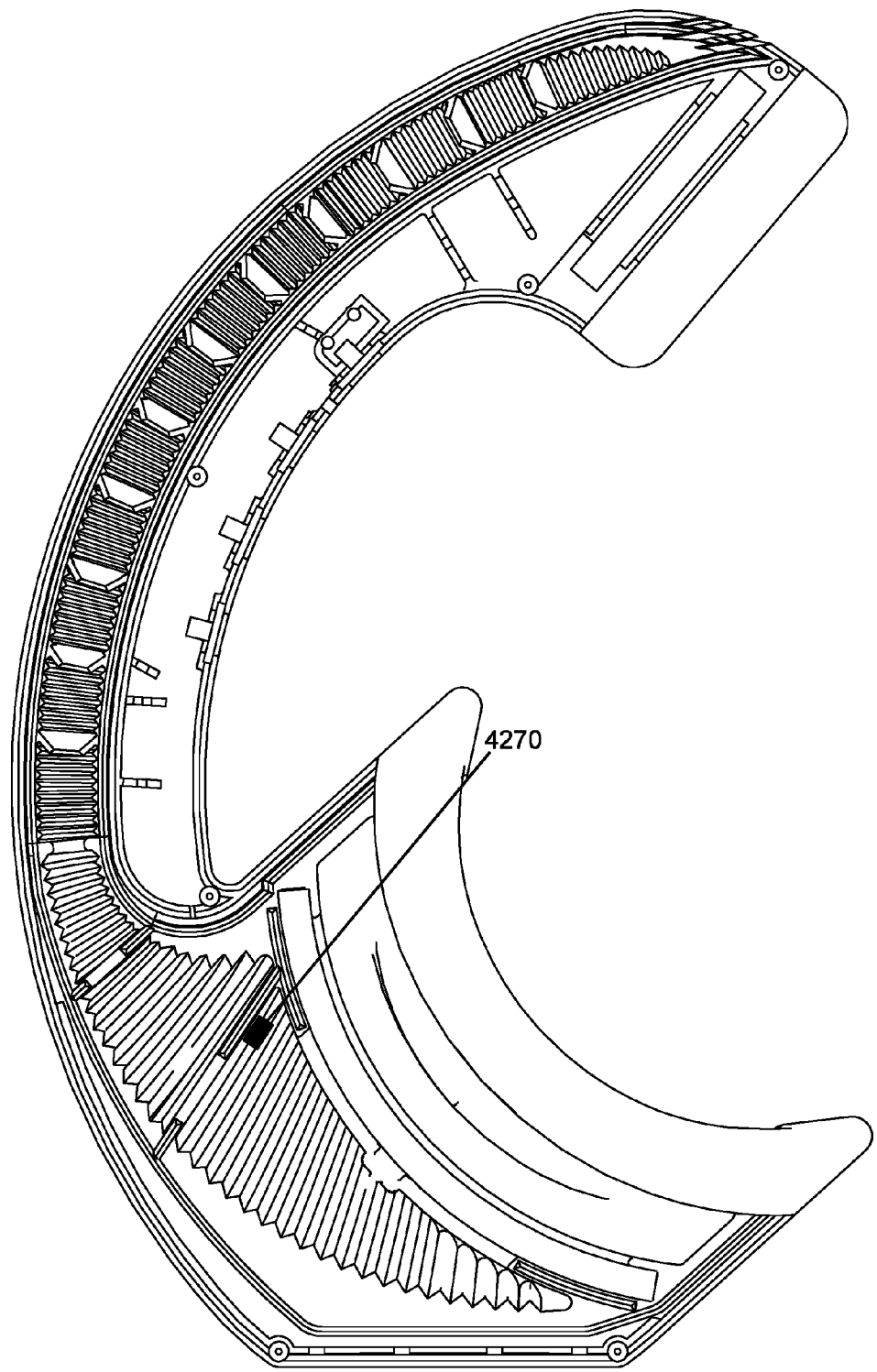
FIG. 17B is a cross-section of the embodiment shown in FIG. 14 with a microphone positioned in a second location; and, FIG. 17O is a cross-section of the embodiment shown in FIG. 14 with a microphone positioned in a third location.
Figure 17C:
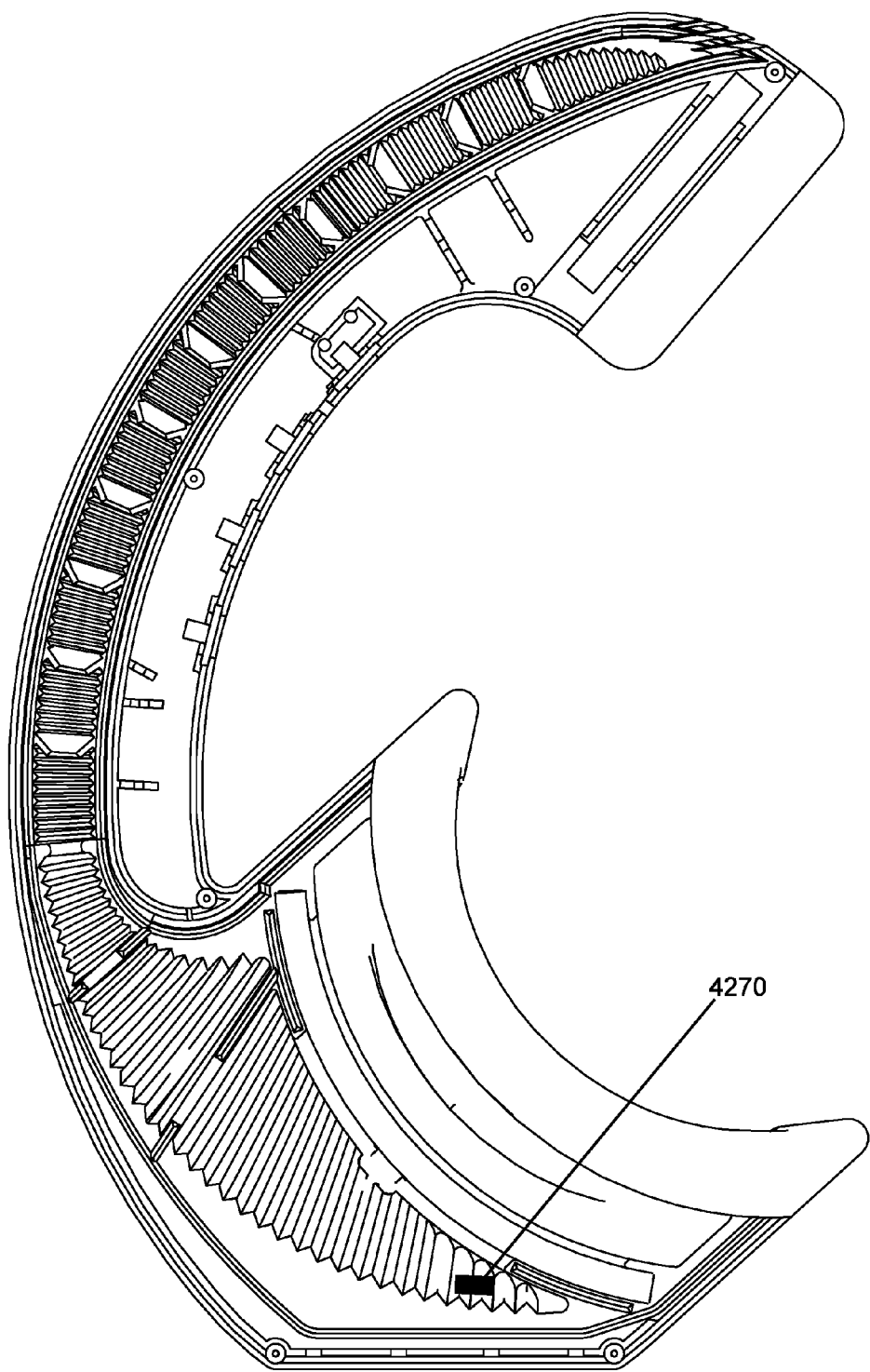

As shown in FIGS. 14 and 15, the suppressor channel 4250 features baffling 4152 for restraining or regulating the flow of air through the suppressor channel 4250. Structurally, the baffling 4152 is spaced at graduatedly shorter distances along the handle 4200. Suitably, the baffling 4152 causes a series of alternating contractions and expansions of the air so that heat and sound energy is dissipated and the signature of sound is changed as air moves through the channel 2250. Suitably, the openings of the baffling 4152 may be aligned coaxially with the channel 4250, as shown in FIGS. 14 and 15, or staggered (not shown) for increased turbulence of air as it moves through the channel 4250. In one embodiment, shown in FIG. 16, the baffling 4152 is angled so that portions of the air may be trapped by sound particle turbulence in the space 4153 between the channel's 4250 sidewall and baffling 4152. Suitably, sound waves expand or diverge as they are directed through the baffling 4152 into the adjacent space or cell along the channel 4250 with a whirling or rotary movement. Suitably, this turbulence creates a noise canceling environment. In use, the rapid rotary movement of the sound waves presses outward against the wall of the channel, and the velocity of movement of the sound waves is gradually reduced. Referring to FIGS. 14, 15, and 16, the channel 2250 further features contours 4151 for increasing the surface area of its internal sidewalls. Preferably, these peak contours are a specific shape to enhance the absorption of high, medium and low base megahertz frequencies. In the depicted embodiment, those contours are defined by wedges or ridges. As shown, the contours 4151 cooperate to guide sound energized air over its surface area and around corners to physically make the air lose sound wave energy or otherwise change the signature of the sound energy. In a preferred embodiment, the suppressor channel 4250 is provided with an air vent 4252 through the handle 4200 so that air that has been de-energized of sound energy may be exhausted to the ambient atmosphere. Ultimately, the sound waves exit the suppressor channel at a greatly reduced velocity with little or no sound signature. As shown, the exhausted air from the vent 4251 is directed away from the ear chamber 4300 so that if any sound energy remains in the air, the remnant energy will be directed away from the ear chamber 4300 and its speaker and anyone around the speaker.

Referring now to FIG. 14, the upper portion of the handle 4200 features a housing 4260 for retaining the electronics that enable the apparatus to be used in the manner of a telephone handset. This housing 4260 further allows for sound vibration isolation from the suppressor chamber 4100 and sub assembly for manufacturing so the chamber 4100 is easily assembled in a substantially sound-tight manner, which may be important to operation of the device. The electronic separation is also preferred to direct and expel the electronic heat from the device. As shown, the housing 4260 retains a battery 4261, a mother circuit board 4262 that is electrically coupled to the phone controls 4210 (including volume controls, on/off controls, and hold microphone button controls), a speaker 4263, a microphone 4270 (shown in FIG. 15) that is specifically designed to function in a positive air pressure environment, and a receiver/transmitter 4264 (e.g., Bluetooth®) (which may be coupled to the mother circuit board 4262 for receiving and transmitting communications to and from a device (e.g., cell phone, two way radio, or home phone). These phone electronics are configured to operate in the manner of a Bluetooth® or other wireless headset for mobile, home, or office communication devices.

Referring to FIG. 15, the microphone 4270 is positioned centrally within the suppressor chamber. Alternative positioning of the microphone 4270 is also available and shown in FIGS. 17A through 17C. Specifically, the microphone 4270 may be positioned centrally (FIG. 17A) at the confluence of the suppressor chamber and channel, toward the bottom middle (FIG. 17B) at the confluence of the suppressor chamber and channel, or toward the top middle (FIG. 17C) at the confluence of the suppressor chamber and channel. Suitably, the microphone 4270 is configured for use within a pressurized chamber and with a substantially sound-tight seal between the suppressor chamber and the housing 4260. In other words, the microphone 4270 is specifically designed to function in a positive air pressure environment. In one embodiment, the microphone may suitably be a MEMs (Micro-Electro-Mechanical System) microphone. Suitably, impedance mismatch due to static pressure and different volumes of air pressure and decibel levels can be countered and anticipated in real-time with MEMs microphones because they can be programmed via software to change the way the microphone reacts under various air pressures and decibel levels of the user. Also, input impedance may be automatically adjusted with each user, noting tonality and decibel volume changes from user-to-user. It should be noted that voice frequency for telephony is in the range of 300 Hz to 3400 Hz and it is preferred that software be used to block any frequencies that are not within that range. Other microphones that are suitable for use in the device include, but are not limited to, impedance-matching microphones, noise canceling microphones, dynamic microphones, ribbon microphones, carbon microphones, piezoelectric microphones, fiber optic microphones, laser microphones, liquid microphones, MEMs microphones and speakers. In one embodiment, the microphones may be unidirectional, but omnidirectional, cardioid, bi-direction, and shotgun microphones may also be suitable for use.

As alluded to above, the apparatus 4000 is designed to be operated in the manner of a telephone handset. As with earlier embodiments, the apparatus 4000 is operated via placing (1) the mouth opening 4110 securely over the mouth of a user so that the cushioning 4140 or flexible rubber seal of the device 4000 is firmly and comfortably positioned around the mouth of the user and (2) the ear opening 4310 over the ear of a user so that the cushioning 4330 is firmly positioned around or over the ear of a user. The details regarding operation of the handset of the preferred embodiment are substantially the same for the operation of the alternate embodiments of the disclosed apparatus.

Yet further disclosed, in general, are devices that provide a substantially sound-tight suppressor chamber over a sound source while trapping, containing, absorbing, directing and deflecting fields of sounds from the sound source (e.g., the mouth of a human). In general, the devices feature: a dual anechoic chamber that is configured to receive a sound source in a substantially sound-tight manner (meaning only allowing muffled unintelligible escape of sound); and a specialized suppressor channel that is in fluid communication with the ambient atmosphere. In a preferred embodiment, the dual anechoic chamber is defined by: a cup shaped anechoic main voice chamber; and a secondary voice airflow anechoic chamber. Suitably, the main and secondary voice chambers create a double sound transmission de-coupler for voice airflow. Other preferred features of the device include an analog to digital and digital to analog telephone circuitry switch. More specific details of alternate embodiments are disclosed in connection with FIGS. 18 through 22.

Figure 18:
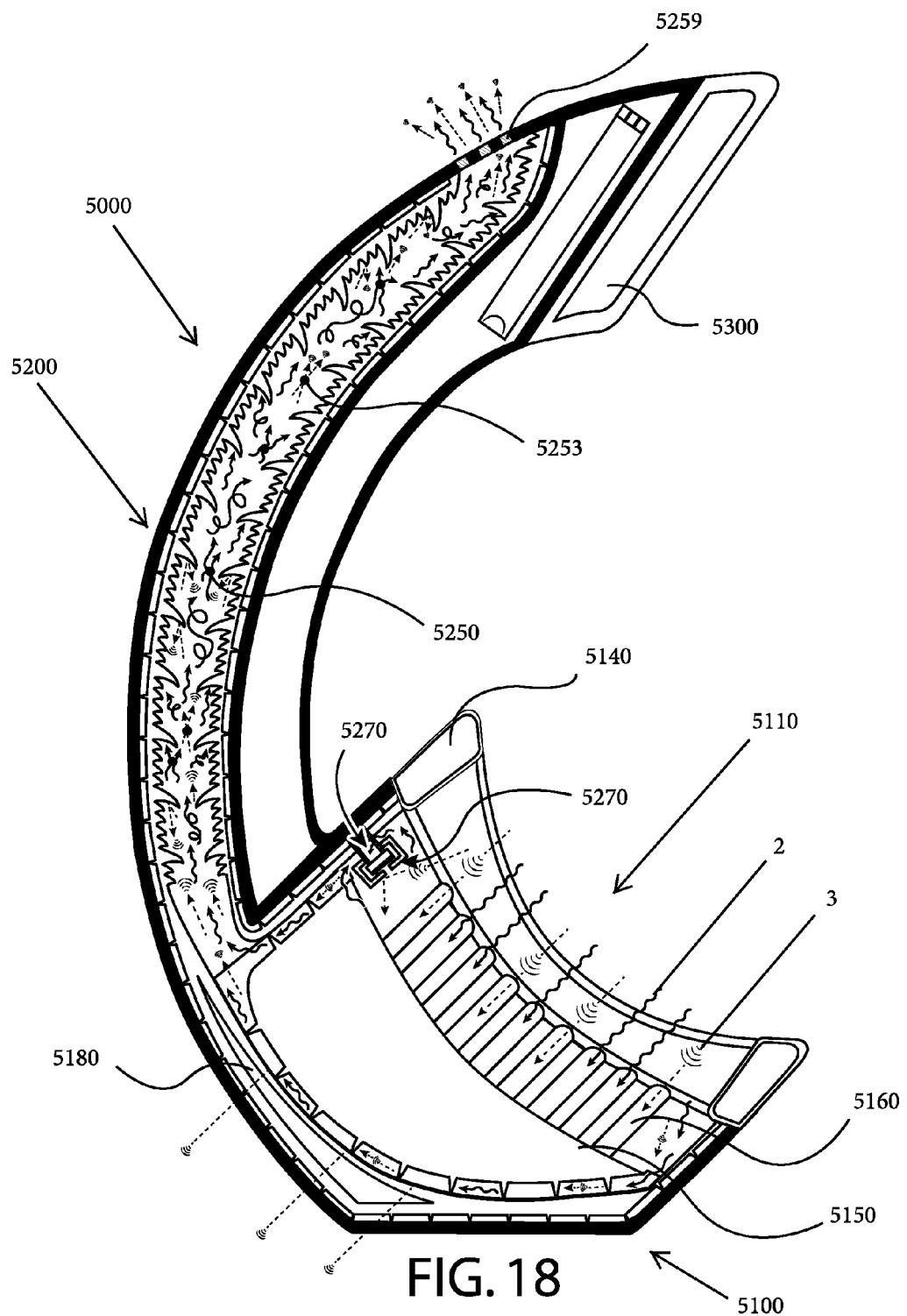
FIG. 18 is a cross section of another embodiment of a device.

FIG. 18 is a vertical cross section view of an apparatus 5000 for maintaining the privacy and clarity of communications made over a communication device. As shown, the apparatus 5000 is generally in the shape of a telephone handset and defined by: (1) a dual anechoic chamber 5100 with a mouth opening 5110 for engaging a mouth of a user (not shown); (2) a handle 5200; and, (3) an ear chamber 5300 with an ear opening 5310 for engaging the ear of a user.

As shown in FIG. 18, the handle 5200 is generally curved wherein: the dual anechoic chamber 5100 is generally positioned at the lower end of the handle 5200; and the ear chamber 5300 is positioned at an upper end of the handle 4200. Both the dual anechoic chamber 5100 and the ear chamber 5300 generally define basins at either end of the handle 5200. The dual anechoic chamber 5100 preferably features cushioning 5140 around the lip of the mouth opening 5110. As shown, the cushioning 5140 preferably features a thin wall of food grade silicone rubber or the like, which is treated with antimicrobial chemicals. In one embodiment, the cushioning 5140 is nitrogen injected to create a thin wall that is airtight allowing the seal around the users mouth to comfortably be compressed around the mouth of a user so that an airtight sound proof environment for speaking is the result. Similarly, the ear chamber 5300 features cushioning 5330 around the lip of the ear opening 5310. Finally, the handle 5200 is configured with a curve so that it can be gripped by the hand of a user (not shown) while the ear and dual anechoic chambers (5100, 5300) are simultaneously positioned over the user's ear and mouth. In a preferred embodiment, the handle 5200 may have a curvature and shape of a banana fruit for the ergonomic use and comfort of a user. Although not shown, the handle 5200 may further feature grips to assist users with arthritis afflictions in holding the apparatus 5000. Lower profile shapes are also contemplated.

As with earlier embodiments described above, the apparatus is configured to fit securely over the ear and mouth of a user, without substantially breaking the sound-tight seal between the mouth opening and mouth of a user and the seal between the ear opening and the ear of a user. Suitably, this is accomplished via positioning the apparatus at a metocervical angle in a range of fifteen and twenty five degrees relative to the face of a user. A preferable mentocervical angle position for the apparatus is about nineteen degrees for female users and about twenty three degrees for male users. These metocervical angle positions result in the appropriate ear to mouth engagement at an eighty-eighth percentile relationship for both of the bitragion sub-nasale arc and the bitragion-menton arc measurements. This insures even/equal user pressure around the entire menton subnasale area (i.e., direct contact area of the entire perimeter of the product's face sound seal) and the center of the ear.

As discussed in greater detail below, the apparatus 5000 is designed to receive and transmit telephone communications from and to a communication device (e.g., wirelessly via Bluetooth® type technology) or wired communication device (e.g., landline phone) and generally be operated in the manner of a telephone handset.

Figure 19:
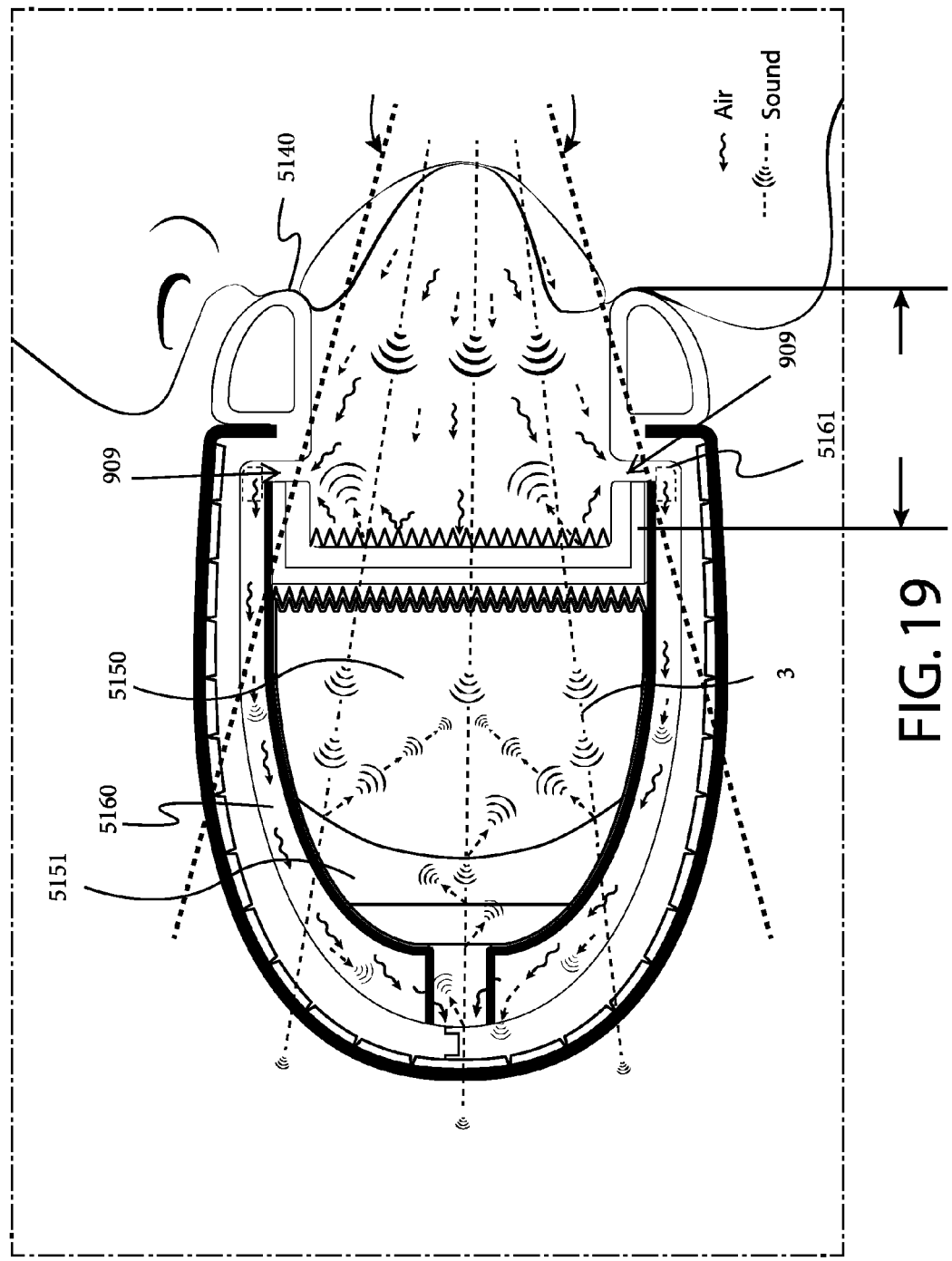
FIG. 19 is a horizontal cross section of an anechoic chamber of the device of FIG. 18.

FIG. 19 is a cross-section of the dual anechoic chamber of FIG. 18. The cross-sections of FIGS. 18 and 19 are intended to illustrate the interior workings of the preferred embodiments. Specifically, the figure illustrates certain inner workings of the sound trapping, containing, absorbing, directing and deflecting components of the apparatus 5000 and the electrical components for telephonic communications. Referring to both figures, the phone electronics (not shown for the most part) are (apart from a microphone 5270) disposed within the acoustic chamber, and preferably isolated from sound absorbing components to ensure the sound components create a substantially or completely sound-tight environment.

Still referring to FIGS. 18 and 19, sound may be captured and/or absorbed or directed from the flow of air caused by speech during use of the apparatus 5000. In a preferred embodiment, sound energy is captured and absorbed/dissipated via the dual anechoic chamber 5100 and the suppressor channel 5250 disposed within the handle 200. Suitably, the dual anechoic chamber 5100 is adapted to capture air 2 containing sound energy 3 generated by a sound source (not shown) and provide the air 2 through the suppressor channel 5250 (i.e., the channel 5250 provides fluid communication between the dual anechoic chamber 5100 and the ambient).

Referring to FIGS. 18 and 19, the dual anechoic chamber 5100 features: a cup shaped anechoic primary or main voice chamber 5150; and a secondary voice airflow anechoic chamber 5160. Suitably, the main and secondary voice chambers create a double sound transmission de-coupler for voice airflow. In one embodiment, a cored out area 5180 (FIG. 18) defines another air gap acoustic de-coupler for the voice sound waves 3 (i.e., sound loses its transmission capabilities in the cored out area 5180). As shown, the primary chamber 5150 is defined by a cavity in the dual anechoic chamber 5100 and the secondary chamber 5160 is defined by a plurality of troughs around the outside of the primary chamber, from the opening 5110 to the suppressor channel 5250. As shown in FIG. 9, an airtight seal may be formed around the lips of a user via the cushioning 5140 so that, when the user speaks sound and air may be provided into and trapped within the primary chamber 5150 while also passing through the secondary chamber 5160, the suppressor channel 5250 and to the ambient. Any sound 3 and air 2 that is not trapped within the primary chamber may be provided to the suppressor channel 5250 by a pathway 5151 for that purpose. In a preferred embodiment, the primary chamber 5150 is held away from the secondary anechoic chamber 5160, and away from the voice air blast area, via air flow spacer blocks 5161, which maintain the space of the secondary chamber 5160 (shown in broken lines). As a result, there is very little physical vibration feedback to the user. When so configured as shown (FIG. 18), air pressure 2 and sound 3 is not prevented from being able to come in contact with the front and back of the microphone sensing plate inside the noise canceling microphone 5270. Suitably, pressure is equally spread around the entire outside and inside surfaces of the noise cancelling microphone 5270 so that the equalized pressure (sound pressure level) does not distort the ability for the microphone to pick up clear voice sounds. For this purpose, the microphone 5270 features a shield 5271 that is positioned up around the frontal area of the microphone 5270 to shield the microphone from natural air blasts from the voice of the user during speaking. In short, the secondary anechoic chamber 5160 collects air from in-between the first and second anechoic chambers around the perimeter of the mouth, in the low decibel environment away from the voice blast high decibel areas in front of the mouth. Voice air from speaking fills up the primary anechoic cup chamber 5150 and once the primary anechoic cup chamber is full of air, then the air is channeled, through a channel 909, to the secondary anechoic chamber 5160, then into the suppressor channel, and then the voice air will exit the telephone with as low of decibel energy left as possible.

In a preferred embodiment, the primary chamber 5150 is positioned three-quarters of an inch to one and one fifth inch away from the mouth of a user to promote the sound capture. At this distance range, the user's lips and tongue will not hit any part of the primary anechoic chamber 5150 during conversation into the device. Preferably, this configuration promotes comfort and cleanliness, since the primary anechoic chamber can be easily removed and cleaned in a sink, shaken dry, and re-inserted. Additionally, the second anechoic chamber can also be cleaned with relative ease.

Figure 20:
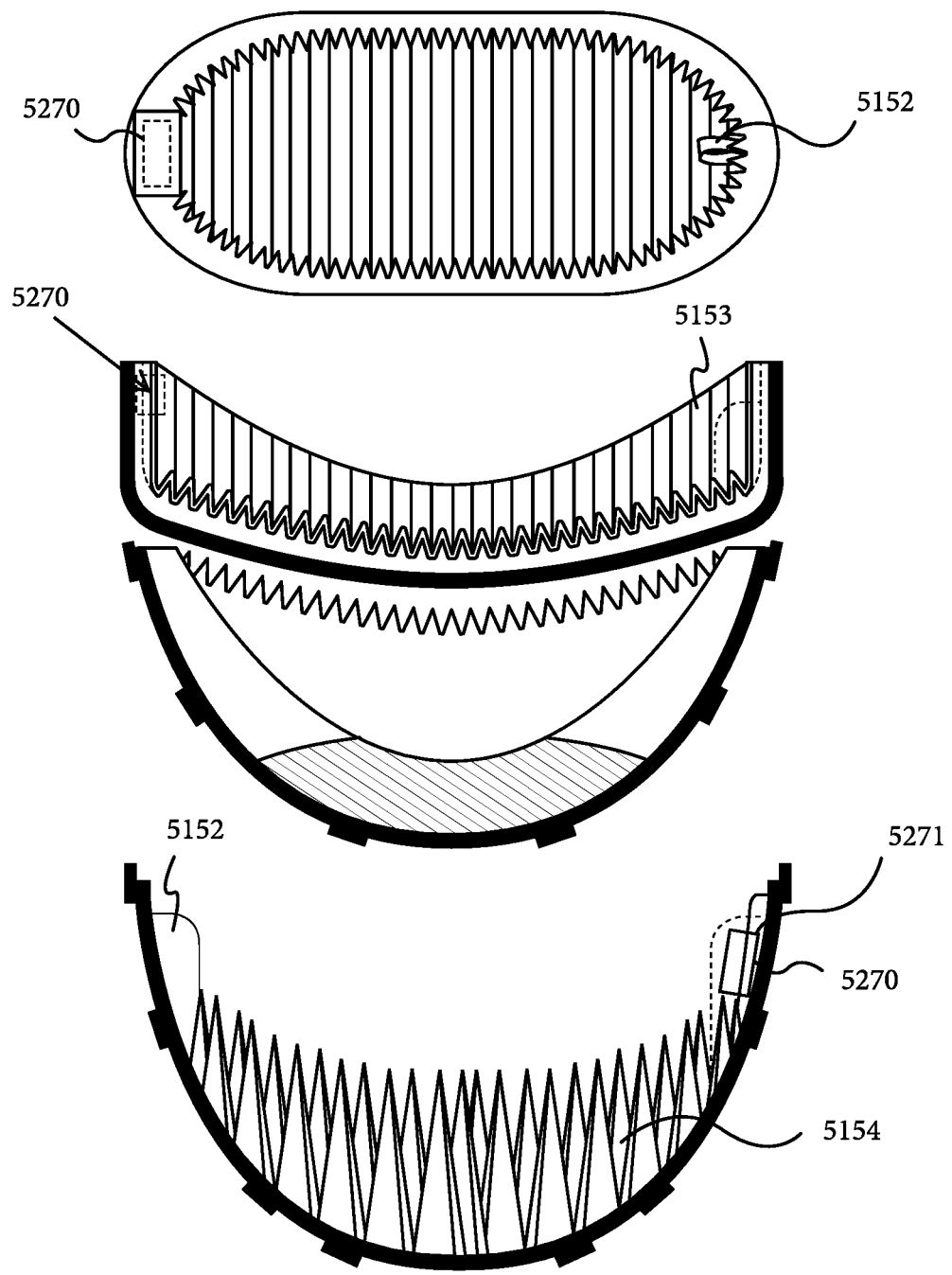
FIG. 20 is a plurality view of the anechoic chamber of FIG. 19.

FIG. 20 is a plural view of the main chamber 5150. A top view is provided first and two cross sections are provided next. In a preferred embodiment, the main chamber 5150 is removable from, and features a pull tab 5152 for removing the component from the dual anechoic chamber 5100. As shown, the chamber 5150 may be constructed of different materials and ribbed 5153 to maximize the sound absorption of a voice. In a preferred embodiment, the basin of the chamber 5150 features pyramid structures 5154 to assist in sound absorption by creating maximum surface area to absorb and deflect sound and absorb voice "heat" energy.

As shown in FIGS. 14 and 15, the suppressor channel 5250 features baffling 5153 for restraining or regulating the flow of air through the suppressor channel 5250. Structurally, the baffling 5153 is spaced at graduatedly shorter distances along the handle 5200. Suitably, the baffling 5153 causes a series of alternating contractions and expansions of the air so that heat and sound energy is dissipated and the signature of sound is changed as air moves through the channel 5250. Suitably, the openings of the baffling may be aligned coaxially with the channel 5250, as shown in FIG. 18, or staggered (not shown) for increased turbulence of air as it moves through the channel 5250. In one embodiment, shown in FIG. 18, the baffling is angled so that portions of the air may be trapped by sound particle turbulence in the space 5253 between the channel's 5250 sidewall and baffling 5252. Suitably, sound waves expand or diverge as they are directed through the baffling 5252 into the adjacent space or cell along the channel 5250 with a whirling or rotary movement. Suitably, this turbulence creates a noise canceling environment. In use, the rapid rotary movement of the sound waves presses outward against the wall of the channel, and the velocity of movement of the sound waves is gradually reduced. Referring to FIG. 18, the channel 5250 further features contours 5251 for increasing the surface area of its internal sidewalls. Preferably, these peak contours are a specific shape to enhance the absorption of high, medium, and low base megahertz human voice frequencies. In the depicted embodiment, those contours are defined by wedges or ridges. As shown, the contours 5251 cooperate to guide sound energized air over its surface area and around corners to physically make the air lose sound wave energy or otherwise change the signature of the sound energy. In a preferred embodiment, the suppressor channel 5250 is provided with an air vent 5259 through the handle 5200 so that voice air that has been de-energized of sound energy may be exhausted to the ambient atmosphere. Ultimately, the sound waves exit the suppressor channel at a greatly reduced velocity with little or no sound signature. As shown, the exhausted voice air from the vent 5259 is directed away from the ear chamber 5300 so that if any sound energy remains in the air, the remnant energy will be directed away from the ear chamber 4300 and its speaker and anyone around the speaker.

As alluded to above, the apparatus 5000 is designed to be operated in the manner of a telephone handset. As with earlier embodiments, the apparatus 5000 is operated via placing (1) the mouth opening 5110 securely over the mouth of a user so that the cushioning 5140 or flexible rubber seal of the device 5000 is firmly and comfortably positioned around the mouth of the user and (2) the ear opening 5310 over the ear of a user so that the cushioning 5330 is firmly positioned around or over the ear of a user. The details regarding operation of the handset of the preferred embodiment are substantially the same for the operation of the alternate embodiments of the disclosed apparatus.

Figure 21:
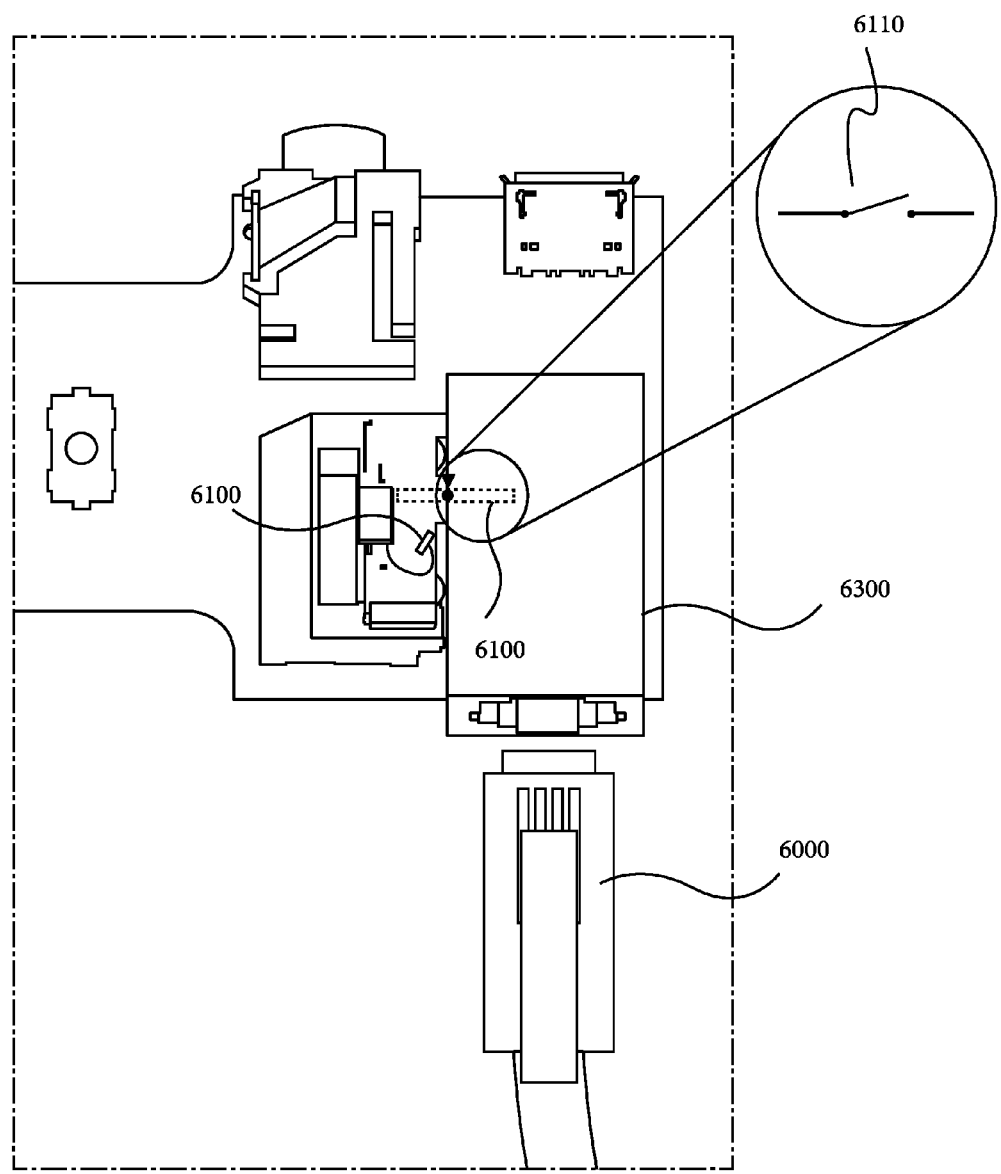
FIG. 21 is a circuit board of the device of FIG. 18.
Figure 22:
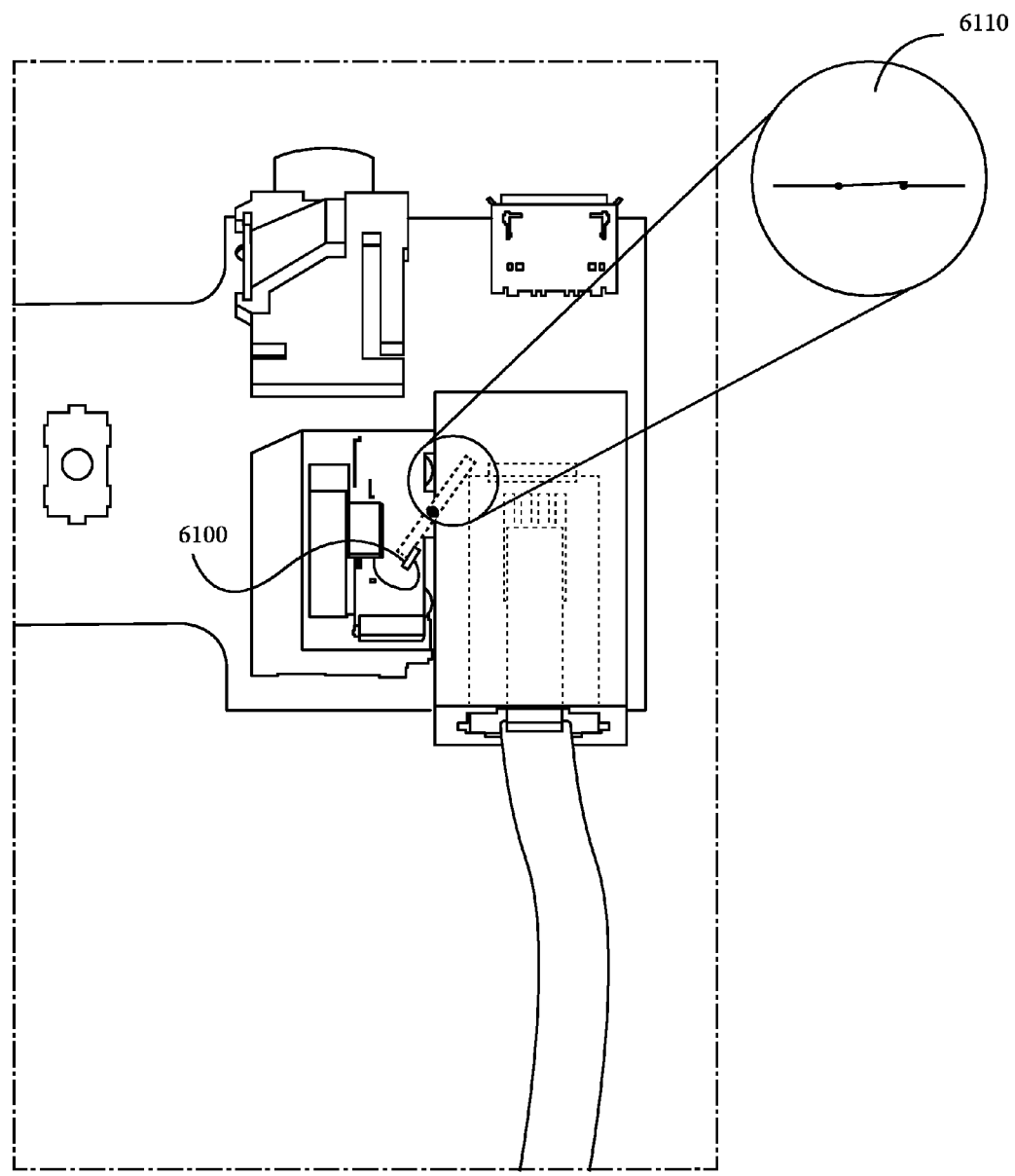
FIG. 22 is a circuit board of the device of FIG. 18.

FIGS. 21 and 22 depict a circuit board within the handle 5200 of the device 5000 of the earlier figures. As shown, the board may feature: a telephone cord female jack connection 6300, wherein the telephone female jack 6300 mounted on the circuit board receives a quick release levered male jack 6000 connected to a wire from the telephone base set; a mechanical switch 6100 defined by a physical switch that moves when the male jack 6000 is inserted into the female jack connection 6300 located on the printed circuit board; and, a mechanical physical analog to digital sensing switch 6400, which may also be, but is not limited to, mechanical, optical, or magnetic. As shown in FIGS. 21 and 22, the switch 6100 may be open (as shown in FIG. 21 at 6110) or closed (as shown in FIG. 22 at 6110). Additionally, the outside shell of the apparatus 5000 is configured specifically to absorb human voice frequencies.

Figure 23:
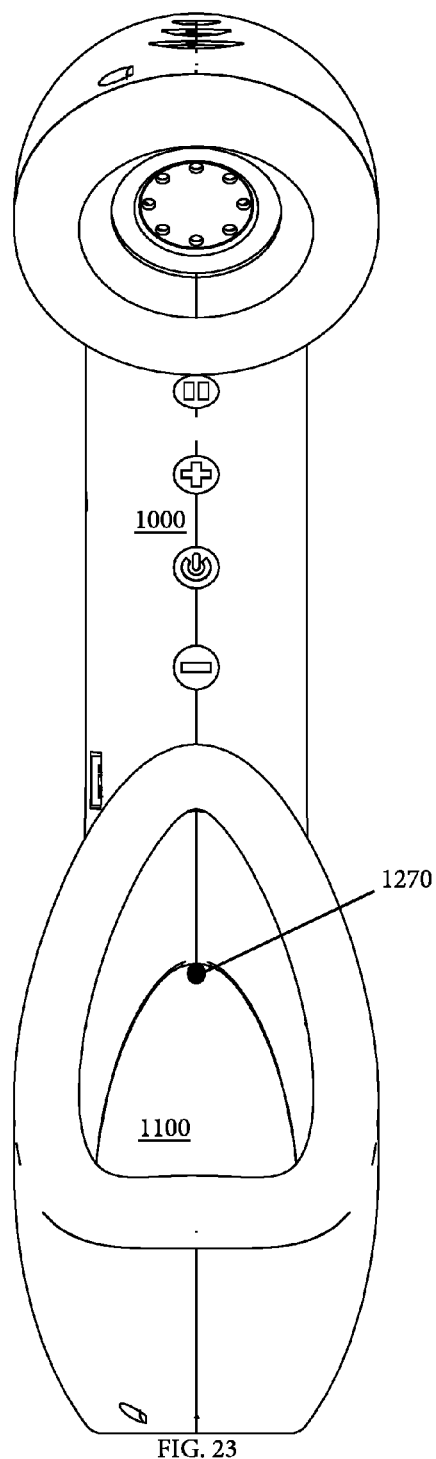
FIG. 23 is a front view of another embodiment of a device.
Figure 24:
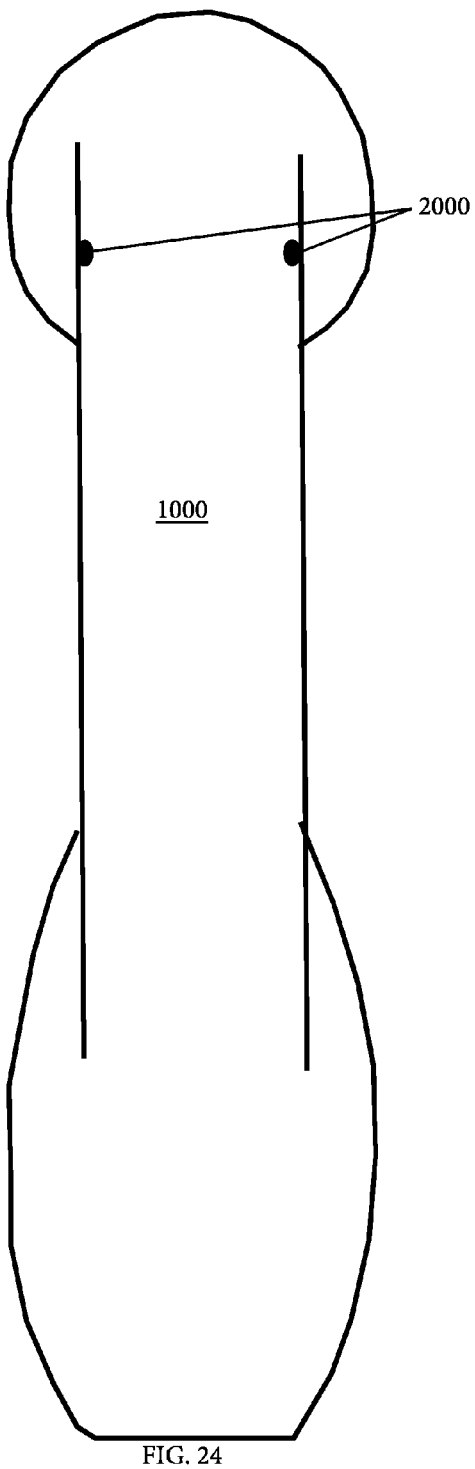
FIG. 24 is a rear view of the device of FIG. 23.
Figure 25:
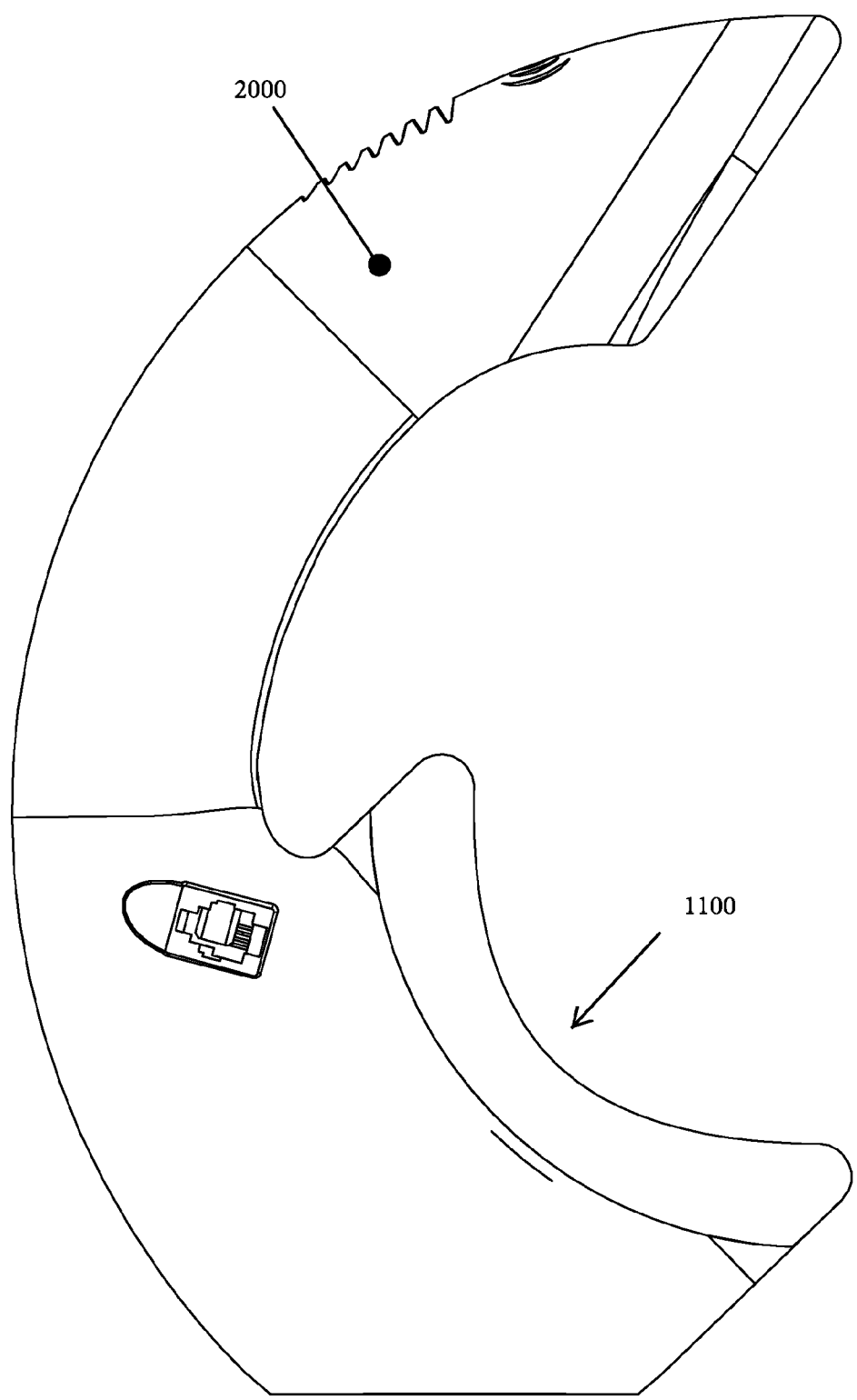
FIG. 25 is a right-side view of the device of FIGS. 23 and 24.
Figure 26:
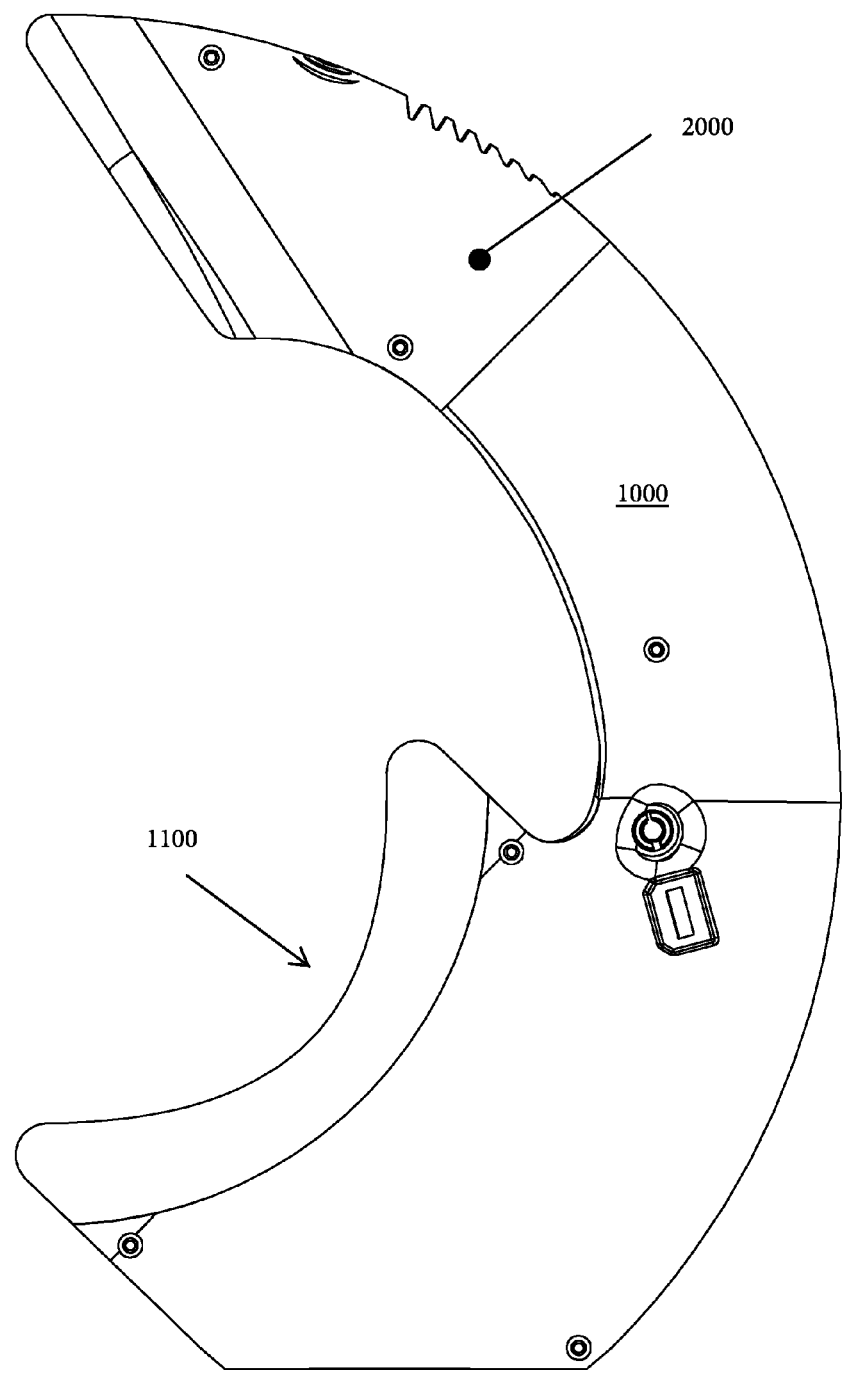
FIG. 26 is a left-side view of the device of FIGS. 23 through 25.

FIG. 23 is a front view of another embodiment of a device 1000. FIG. 24 is a rear view of the device 1000. FIG. 25 is a right-side view of the device 1000. FIG. 26 is a left-side view of the device 1000. This device 1000 differs from embodiments of the device shown in FIGS. 1 through 22 in two meaningful ways. First, the device 1000 of FIGS. 23 through 26 features an improved notification light 2000 to alert a user to the status of the device 1000. Second, the device 1000 of FIGS. 23 through 26 features active noise control or active noise cancellation means ("ANC means") 1270 inside of the device 1000. Said means 1270 includes a sound source (like an antiphase/anti-noise speaker) for the addition of sound specifically designed to cancel noise presented within the anechoic chamber 1100.

Figure 27:
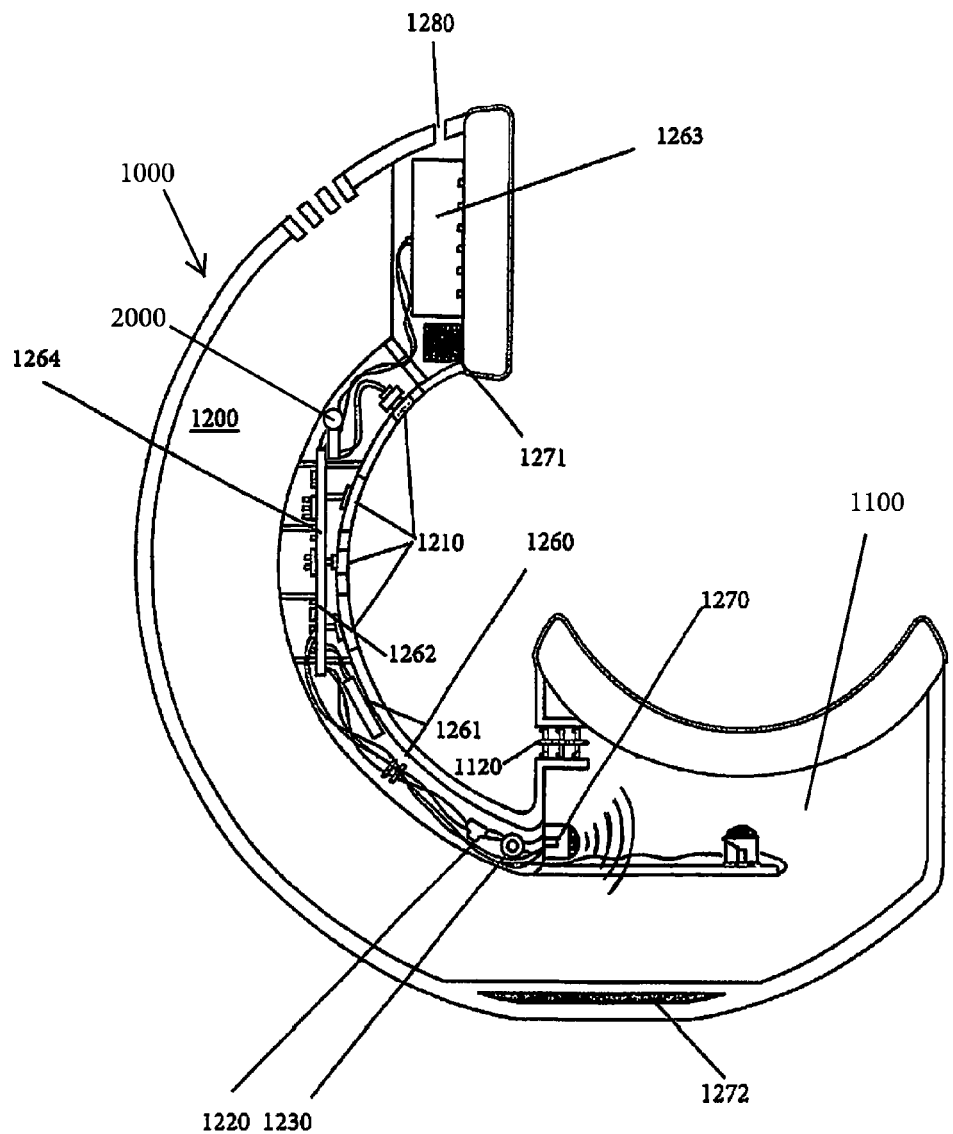
FIG. 27 is a cross section of the device of FIGS. 23 through 26.

FIG. 27 is a cross section of the device of FIGS. 23 through 26. FIG. 27 shows the internal placement of the ANC means 1270 and the light 2000 within the device 1000. As shown, the ANC means is electrically coupled to the coupled to the printed circuit board of the device 1000 so that it is positioned within the anechoic chamber 1100. The light 2000 features a light source and is also electrically coupled to the PCB of the device 1000.

Figure 28:
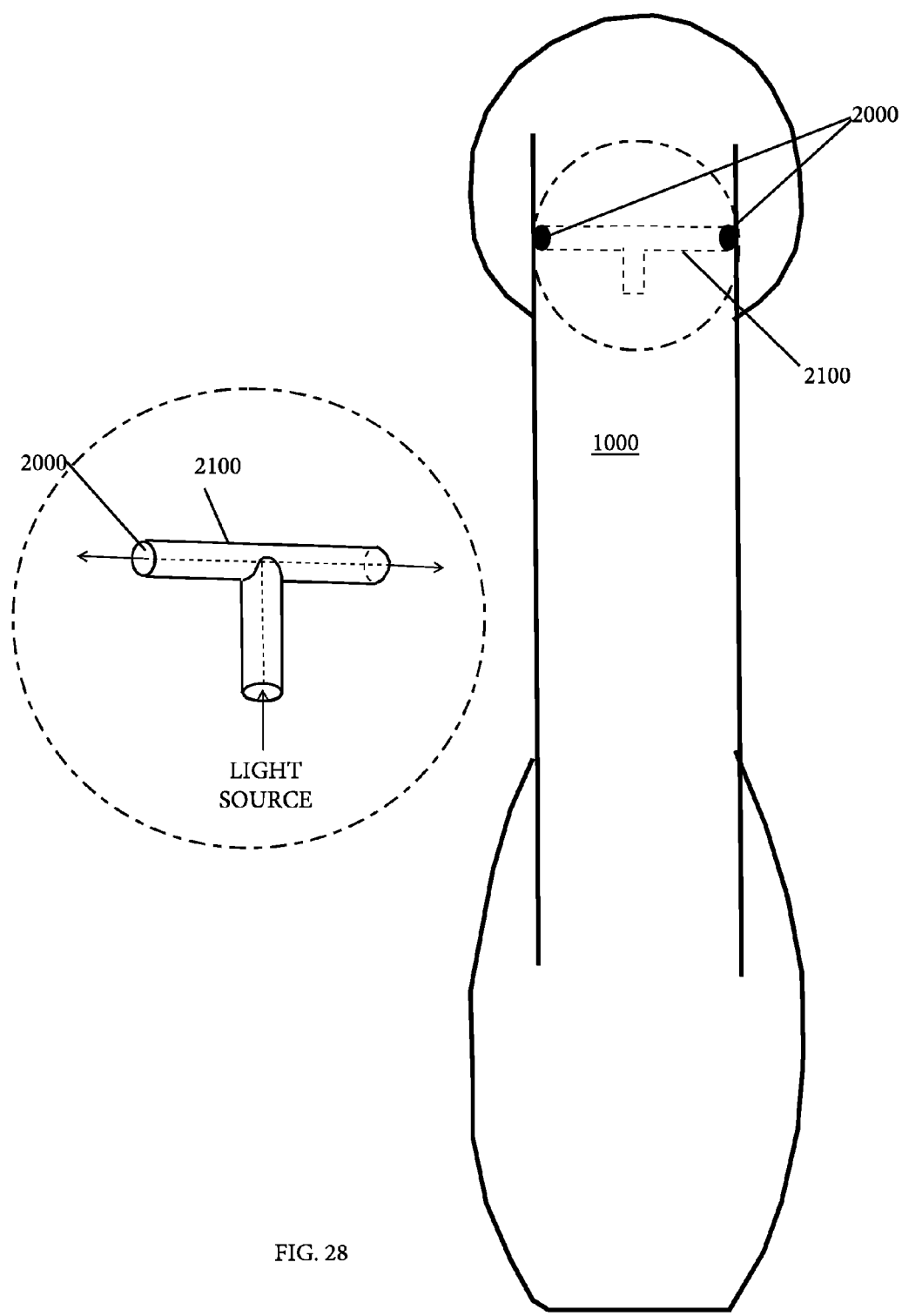
FIG. 28 is an x-ray view of the rear of the device of FIGS. 23 through 26.

FIG. 28 is an x-ray view of the rear of the device 1000. The view illustrates the structure and operation of the light 2000. As shown, the light 2000 is structured as a T-shaped tube 2100 of light conducting material (e.g. glass) that is positioned adjacent to a LIGHT SOURCE so that light may be split as it passes through the T-shaped tube 2100 for presentation at two sides of the device 1000. In use, the light 2000 and its LIGHT SOURCE (e.g., an LED bulb) is coupled to a circuit board and illuminated to present the status of the device 1000 (e.g., an incoming call, hold, Bluetooth® sync, battery status, etc.) Presentation of the status on both sides of the device 1000 via a light tube 2100 enables a user to view the status of the device for three-hundred and sixty degrees around the device 1000 with only a single LED bulb.

Figure 29:
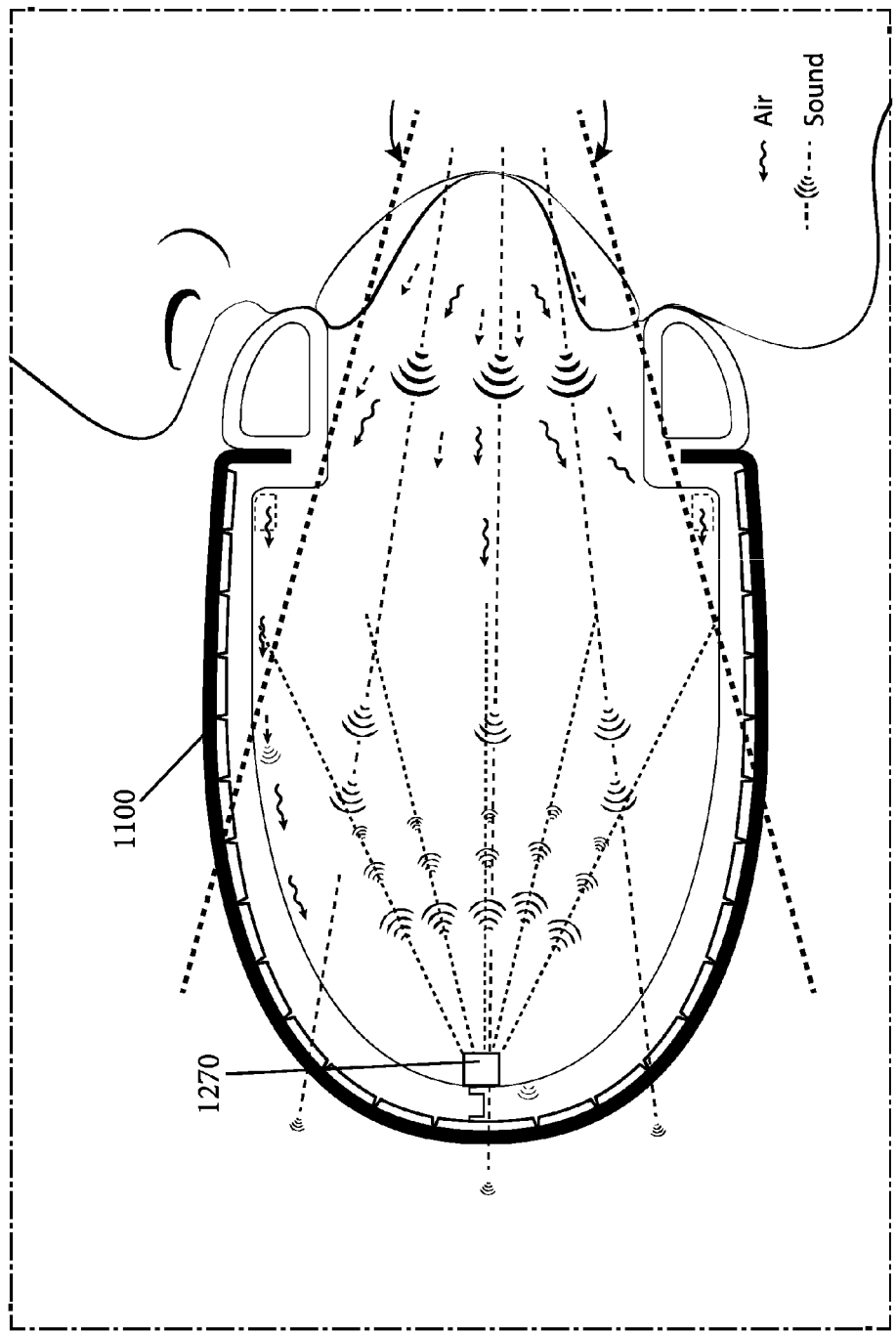
FIG. 29 is an illustration of the operations of the device of FIG. 23 through 26.

FIG. 29 is an illustration of the operations of the device 1000. As shown, ANC means 1270 are provided to the device 1000. Said means 1270 include a sound source for the addition of sound specifically designed to cancel noise outside of the anechoic chamber. Preferably, the ANC means 1270 reduces unwanted sound by the addition of a second sound within said anechoic chamber 1100. Suitably, the anechoic chambers are adapted to capture air containing sound energy generated by the sound source (e.g., human voice), and distribute the air about internal anechoic acoustical surface areas on the inside of the chambers, wherein the internal surface areas are maximized and sufficiently large to dampen or otherwise absorb the sound energy. The amount of sound energy absorbed by the anechoic chambers can be reduced via the presence of an ANC means (like an antiphase/anti-noise speaker) for reducing the sound energy in the captured air by providing the addition of a second sound to within the anechoic chamber. Placement of a user's face inside the sealed area also acts to absorb sound waves in the anechoic chamber. In a preferred embodiment, the device features electronics software on a printed circuit board (PCB) which measures the sound of a user's voice via a microphone and creates an antiphase noise to cancel the sound of the user's voice in substantially real-time (the best as the software can interpret the speech sounds and create antiphase sound waves). In a preferred embodiment, the ear and anechoic chambers are configured for placement so that the device lies along the mentocervical angle, mentocervical angle length, menton-subnasale length, bitragoin-subnasale arc, or bitragoin-menton arc of a user at a range of nineteen to twenty three degrees. Other embodiments may not incorporate these angles. In use, a mouth may be placed in the mouth opening to create a substantially air-tight seal and position the mouth so that the acoustics of a communicative sound from the mouth are directed toward the receiver portion of the communication device within the anechoic chamber. By allowing the specific ergonomic design of the mouth seal to push easily into the soft tissue of a user's face around the user's teeth, a substantially air-tight seal is created that does not hinder the user's ideal pronunciation and intonation of verbs adjectives, pronouns and other words easily without stress on the areas of the lips used for pronunciation. In a preferred embodiment, air from the user's breath during speech is directed through the anechoic channel for improved acoustic absorption and microphone sound pick-up. The result is voice communication being contained within the anechoic chamber of the device for maintaining privacy of the phone conversation.

In an alternative embodiment, the switches, circuitry, and software on a PCB allow the apparatus 1000 to auto-sync to a multitude of land lines worldwide by: (1) determining the voltage levels used for speakers and the bias voltage in microphones; (2) gathering the information from all of the sensors to determine which signal is present in each wire; and (3) activating or deactivating the necessary switches to create the route for the audio and voltage signals. This auto-sync for different telephone wire configurations is provided for land lines to insert into the female jack 6300. Thus, the apparatus 1000 may be employed with many different handset wiring configurations worldwide.

Further disclosed, in general, are devices that provide a substantially active noise canceling area over a sound source by causing disruptive interference to all frequency fields of speech sounds from the sound source. In some embodiments, active noise control or active noise cancellation means ("ANC means") are provided to the device. Said means include one or more active noise canceling speakers for the addition of sound specifically designed to cancel noise from the speech sound source. In general, the devices feature: ANC means that are configured to destructively interfere with a sound source by the addition of an antiphase sound in an area around the sound source; a support arm for supporting the ANC means proximate to the sound source. Suitably, the ANC means are adapted to destructively interfere with sound energy generated by the sound source (e.g., human voice), and substantially cancel the sound energy. The amount of sound energy can be reduced via the presence of an ANC means (like an antiphase/anti-noise speaker) for reducing the sound energy. In one configuration, the apparatus features an ear sealed chamber coupled to the support arm and positioned over a user's ear to keep ambient sounds out of a user's ear.

The disclosed devices may provide a substantially active noise canceling area over a sound source by causing disruptive interference to all megahertz frequency fields of communicative sounds by male and female speakers. In one embodiment, the device is defined by: a plurality of ANC means antiphase/anti-noise speakers) disposed about a receiver portion of a communication device; a support arm for the ANC means and receiver portion; and an ear chamber with an ear opening dampening acoustics about a microphone of a communication device. In a preferred embodiment, the device features electronics software on a printed circuit board (PCB), which measures the sound of a user's voice via a microphone and creates an antiphase noise to cancel the sound of the user's voice in substantially real-time (the best as the software can interpret the speech sounds and create antiphase sound waves). In a preferred embodiment, the ear and mouthpiece are configured for placement so that the device lies along the mentocervical angle, mentocervical angle length, menton-subnasale length, bitragoin-subnasale arc, or bitragoin-menton arc of a user at a range of nineteen to twenty three degrees. Other embodiments may not incorporate these angles. In use, a mouth may be placed adjacent to the ANC means and receiver portion to position the components in front of the mouth so that the acoustics of a communicative sound from the mouth are directed toward the receiver portion of the communication device. In a preferred embodiment, air from the user's breath during speech is directed through anti-phase noise created by the ANC means after interaction with the receiver portion of the device for improved acoustic absorption and microphone sound pick-up. The result is voice communication being noise canceled after pickup by the receiver for maintaining privacy of the phone conversation.

Figure 30:
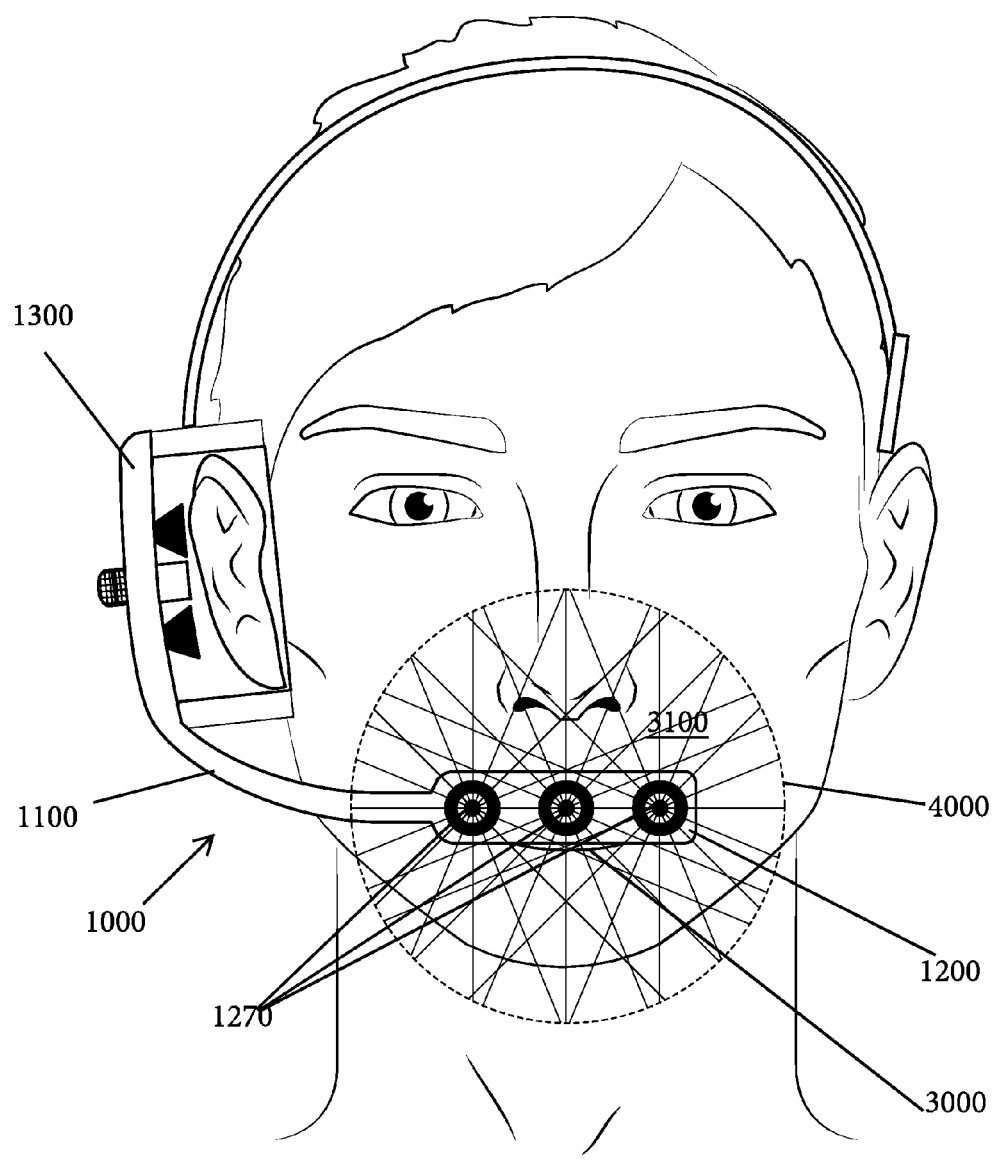
FIG. 30 is a front and environmental view of another embodiment of the device.
Figure 31:
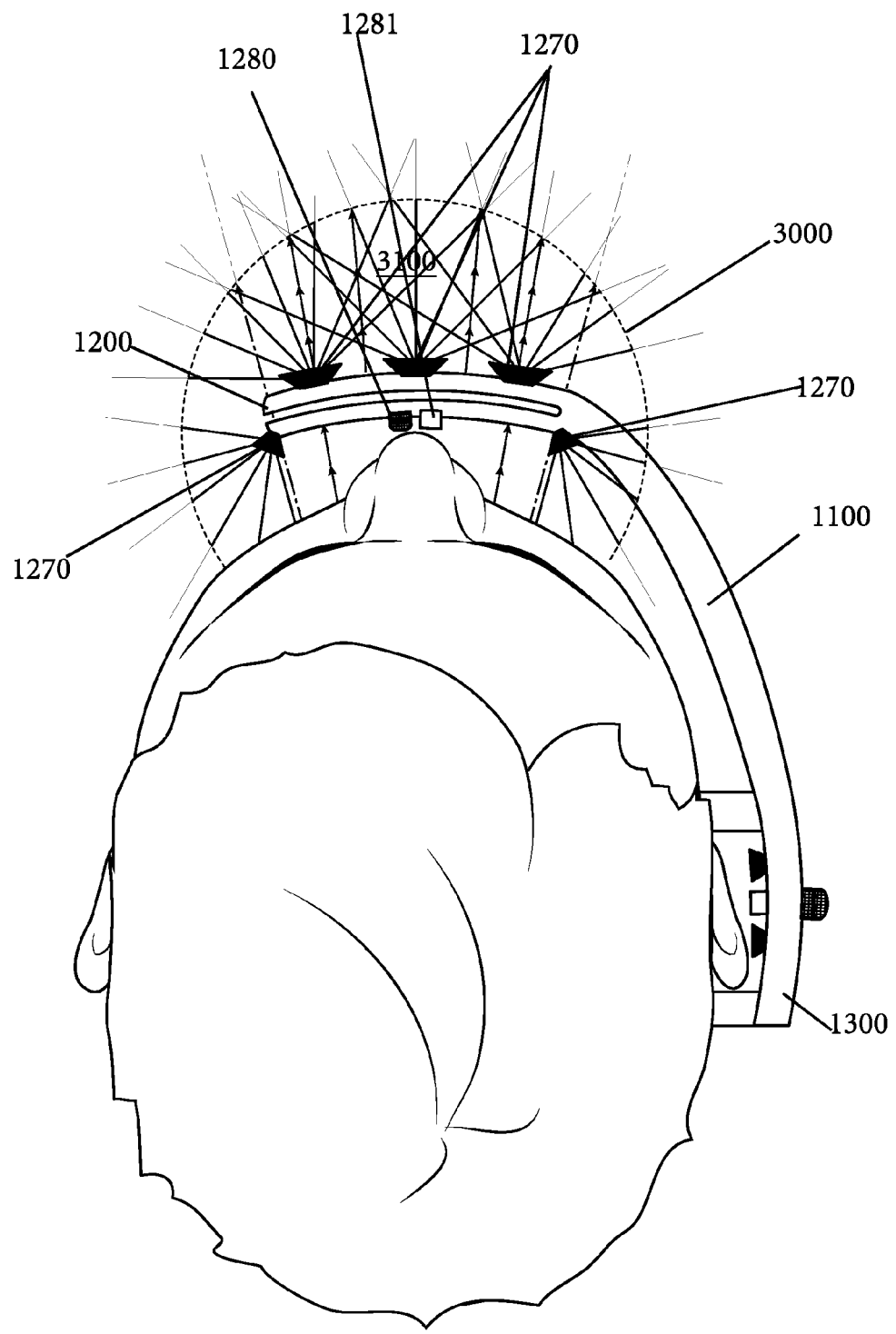
FIG. 31 is a top and environmental view of the device of FIG. 30.
Figure 32:
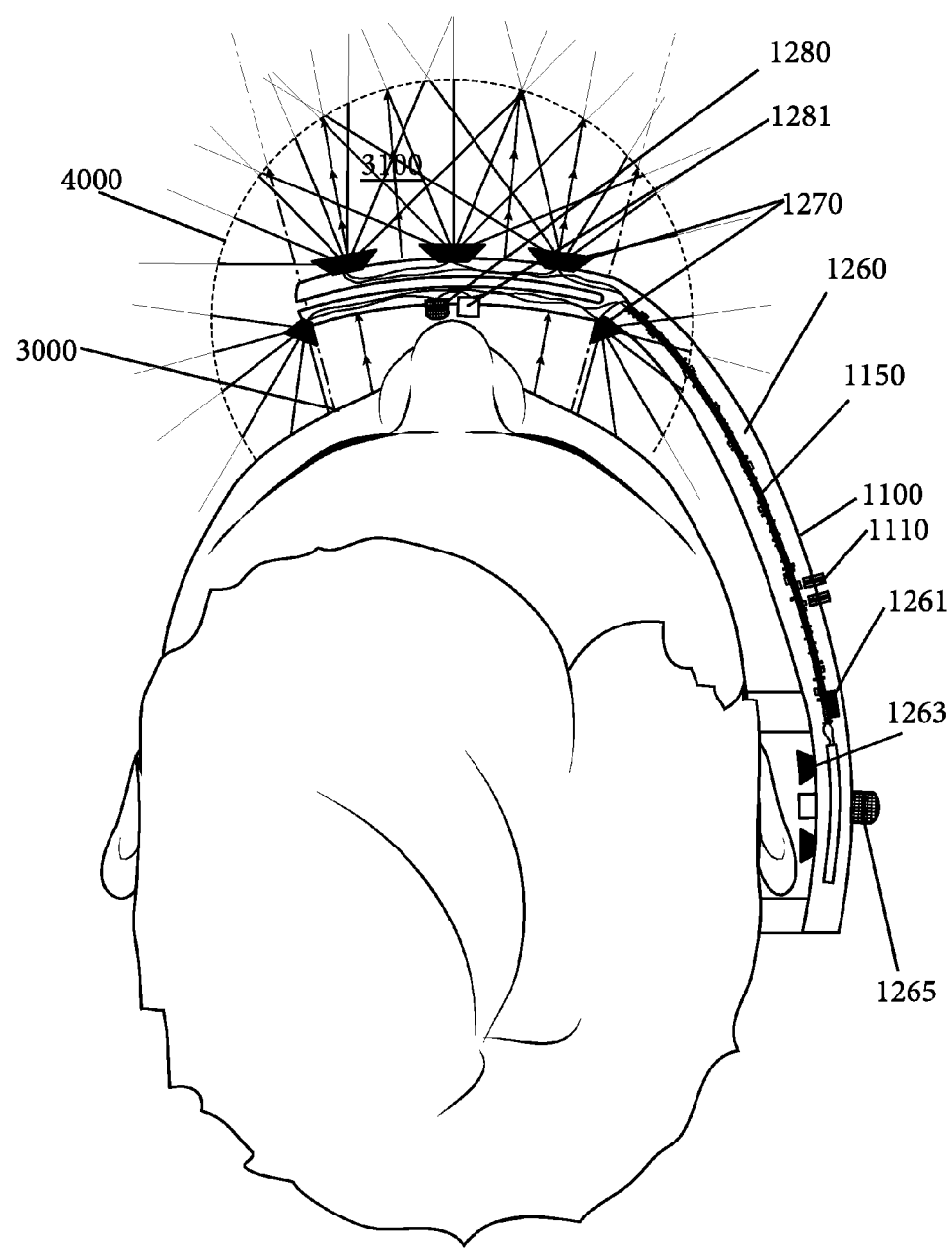
FIG. 32 is a top cross-section and environmental view of the device of FIGS. 30 and 31.

FIG. 30 is a front and environmental view of another embodiment of a device 1000. FIG. 31 is a top and environmental view of the device 1000. FIG. 32 is a cross-section of the device 1000. As shown, the device 1000 of FIGS. 30 through 32 features active noise control or active noise cancellation mouthpiece 1200, a support arm 1100, and an ear piece 1300. Suitably, the mouth piece 1200 features at least one ("ANC means") 1270 on its periphery and a microphone 1280 plus receiver 1281 directed toward a user's mouth (See FIG. 32). Said means 1270 includes a sound source (like an antiphase/anti-noise speaker) for the addition of sound specifically designed to cancel noise presented toward the receiver 1280. In operation, the mouthpiece picks-up voice sounds from the user via the microphone 1280 plus receiver 1281 and projects an active noise canceling area 4000 (show in broken lines) around the user's mouth 3000 via projecting antiphase noise (shown as criss-crossing lines 3100) in all directions from the ANC means 1270 to destructively interfere with any voice sounds produced from the user's mouth. In this manner, the anti-phase sound waves operate as a soundwave "wall" in the area around the mouth and in a matching volume level to cancel sound energy from the sound source (i.e., the human voice). Suitably, once the anti-noise/anti-phase speaker sound waves hit the user's face, the residual sound, not noise canceled, becomes absorbed by the user's face with the reverberant energy reflecting off at a highly diminished decibel level.

FIG. 32 is a cross section of the device of FIG. 31. FIG. 32 shows the internal placement of the ANC means 1270 and other components within the device 1000. The support arm 1100 features a housing 1260 for retaining the electronics that enable the apparatus to be used in the manner of a telephone headset. As shown, the ANC means is electrically coupled to the printed circuit board 1150 of the device 1000 that is positioned within the support arm 1100 of the device. The positioning of the electronics in the arm 1100 is convenient to direct and expel the electronic heat from the device. As shown, the arm 1100 retains a battery 1161, a mother circuit board 1150 that is electrically coupled to the phone controls 1110 (including volume controls, on/off controls, and hold microphone button controls), a speaker 1263, an ambient sensing microphone 1265, a microphone 1280 that is specifically designed to function in a positive air pressure environment, and a receiver/transmitter 1281 (e.g., Bluetooth®) (which may be coupled to the mother circuit board 1150 for receiving and transmitting communications to and from a device (e.g., cell phone, two way radio, or home phone). These phone electronics are configured to operate in the manner of a Bluetooth® or other wireless headset for mobile, home, or office communication devices. In such configurations the blue tooth components will either be off or not located in the device. The microphone 1280 is also positioned so air from the intake will not cause "noise" air flow interference from incoming air when the user breathes. Suitably, the microphone 1280 is specifically designed to function in a positive air pressure environment.

FIG. 32 is also an illustration of the operations of the device 1000. As shown, ANC means 1270 are provided to the device 1000 around the mouthpiece 1200. Said means 1270 include a sound source for the addition of sound specifically designed to cancel noise outside of the anechoic chamber. Preferably, the ANC means 1270 reduces unwanted sound by the addition of antiphase sound around the mouth of a user. Suitably, the mouth piece 1200 is adapted to detect air containing sound energy generated by the sound source (e.g., human voice), and distribute the antiphase sounds to destructively interfere or otherwise cancel the sound energy. In a preferred embodiment, the device features electronics software on a printed circuit board (PCB) which measures the sound of a user's voice via a microphone and creates an antiphase noise to cancel the sound of the user's voice in substantially real-time (the best as the software can interpret the speech sounds and create antiphase sound waves). In a preferred embodiment, the ear and mouth pieces are configured for placement so that the device lies along the mentocervical angle, mentocervical angle length, menton-subnasale length, bitragoin-subnasale arc, or bitragoin-menton arc of a user at a range of nineteen to twenty three degrees.

Other features will be understood with reference to the drawings. While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

The claims as originally filed are incorporated by reference as if fully set forth herein.

I claim:

1. A telephone headset comprising:
a support arm that defines a telephone component housing;
at least a mouthpiece disposed at a first end of the support arm, said mouthpiece positioned adjacent to a mouth of a user, said mouth piece featuring a plurality of active noise canceling speakers and a microphone for receiving sounds to be telecommunicated, wherein said microphone for receiving sounds is directed toward said mouth of the user, and wherein said plurality of active noise canceling speakers are configured to destructively envelop sound from said mouth by the provision of antiphase sound in an area around said mouth via broadcasting antiphase noise in directions that are away from said mouth of the user and toward the face of the user;
an ear chamber disposed at a second end of the support arm with an ear opening for engaging the ear of a user;
a speaker, disposed within the component housing and configured to communicate sound into the ear chamber;

means for receiving and transmitting a telephonic or other electronic communication disposed within the component housing, said means electronically coupled to said speaker, said microphone, and said noise canceling means.

2. The headset of claim 1 wherein the support arm is configured so that the ear chamber engages the ear of a user while the mouth piece simultaneously resides in front of the mouth of a user.

3. The headset of claim 2 wherein the support arm is supported between the ear piece and mouth piece so that said arm is positioned along the jaw of a user when worn at a metocervical angle in a range of fifteen and twenty five degrees.

4. The headset of claim 3 wherein the support arm is supported between the ear piece and mouth piece so that said arm is positioned along the jaw of a user when worn at a metocervical angle of about nineteen degrees for female users and about twenty three degrees for male users.

5. The headset of claim 1 wherein a circuit board is disposed within the support arm, wherein the circuit board is further defined by
a female jack, wherein the female jack receives a lever operated quick disconnect male jack,
a mechanical switch defined by a physical switch, whereby the physical switch moves when a registered jack phone cord is inserted into the female jack, and
a mechanical physical analog to digital and then digital to analog sensing switch.

6. The headset of claim 5, wherein the circuit board:
determines voltage levels used for a speaker and the bias voltage in a microphone;
gathers the information from a-sensor;
determines which signal is present in at least one wire; and
activates a switch to create a route for audio and voltage signals, whereby the headset may be employed with different land line wiring configurations.

7. A method of privately communicating comprising the steps of:
obtaining a telephone headset comprising—
a support arm,
a mouthpiece disposed at a first end of the support arm, said mouthpiece featuring a plurality of active noise canceling speakers and a microphone for receiving sounds to be telecommunicated, wherein said microphone for receiving sounds is directed toward said mouth of the user, and wherein said plurality of active noise canceling speakers are configured to destructively envelop sound from said mouth by the provision of antiphase sound in an area around said mouth via broadcasting antiphase noise in directions that are away from said mouth of the user and toward the face of the user,
an ear chamber disposed at a second end of the support arm with an ear opening for engaging the ear of a user;
simultaneously positioning the mouth opening in front of the mouth of a user and engaging the ear opening with an ear respectively; and,
communicating via the mouth so that air is received over the mouthpiece and sound energy is destructed via antiphase noise from the noise canceling means.

8. The method of claim 7 wherein the arm is supported between the ear piece and mouth piece so that said arm is positioned along a jaw at a metocervical angle in a range of fifteen and twenty five degrees after the step of simultaneously engaging the mouth opening and ear opening with a mouth and ear respectively.

9. The method of claim 8 wherein the metocervical angle is about nineteen degrees for female users.

10. The method of claim 9 wherein the metocervical angle is about twenty three degrees for male users.

\* \* \* \* \*